United States Patent [19]
Morigami

[11] Patent Number: 5,793,496
[45] Date of Patent: Aug. 11, 1998

[54] IMAGE PROCESSING APPARATUS WITH ENLARGED-SCALE PROCESSING FUNCTION

[75] Inventor: Masanori Morigami, Nara, Japan

[73] Assignee: Sharp Kabushiki Kaisha, Osaka, Japan

[21] Appl. No.: 716,645

[22] Filed: Sep. 16, 1996

[30] Foreign Application Priority Data

Oct. 5, 1995 [JP] Japan .................................. 7-259054

[51] Int. Cl.$^6$ .............................. H04N 1/04; H04N 1/393; H01L 27/00
[52] U.S. Cl. ........................ 358/296; 358/451; 358/474; 358/483; 250/208.1
[58] Field of Search ........................ 358/296, 298, 358/448, 451, 471, 474, 475, 483, 486; 250/208.1, 552, 553, 559.01, 559.03, 559.04, 559.05, 559.06

[56] References Cited

U.S. PATENT DOCUMENTS

| 4,561,024 | 12/1985 | Tamura | 358/451 |
| 4,860,118 | 8/1989 | Arimoto | 358/451 |
| 4,920,571 | 4/1990 | Abe et al. | 358/451 X |
| 5,299,029 | 3/1994 | Moriya et al. | 358/447 |

FOREIGN PATENT DOCUMENTS 0 359 292  3/1990  European Pat. Off. ........ H04N 1/393
61-45428  of 1986  Japan .

OTHER PUBLICATIONS

Patent Abstract of Japanese Appl. No. 57-180268, vol. 7, No. 21 (E-155) [1166], Jan. 27, 1983.

*Primary Examiner*—Eric Frahm
*Attorney, Agent, or Firm*—Nixon & Vanderhye P.C.

[57] ABSTRACT

An image processing apparatus is provided with (1) a linear CCD for, upon receipt of an image in the form of light, serially outputting an analog signal, or a signal of each pixel of the image, in sync with and under the control of a first clock, (2) a digital converting circuit for receiving the analog image signal and converting the same into a digital image signal in sync with and under the control of a second clock, and (3) a driving circuit for generating the first and second clocks in such a manner that the rising edges in the former are skipped with respect to those in the latter. Thus, the present apparatus can enlarge an original image only by generating the first clock to have fewer rising edges than the second clock by periodical skipping, thereby making it possible to simplify the enlarged-scale processing.

16 Claims, 23 Drawing Sheets

IMAGE PROCESSING APPARATUS WITH ENLARGED-SCALE PROCESSING FUNCTION

FIELD OF THE INVENTION

The present invention relates to an image processing apparatus furnished with an enlarged-scale processing function, such as a facsimile machine and a copying machine.

BACKGROUND OF THE INVENTION

A facsimile machine or copying machine is known as an image processing machine capable of outputting an enlarged image (an example of which is disclosed in Japanese Examined Patent Publication No. 61-45428 (1986)). As shown in FIG. 23, such an image processing apparatus generally includes a photoreceiving element 92, such as a CCD (Charge Coupled Device). Digital enlarged-scale processing of an original image by the above conventional image processing apparatus will be explained in the following.

To begin with, the photoreceiving element 92 serially outputs analog image data VA to a digital converting circuit 93 in sync with a driving clock Φ11 outputted from a driving circuit 91. Then, the digital converting circuit 93 steadily converts the analog image data VA into digital image output VB and outputs the same to a storage element 94.

An address generating circuit 95 generates driving clocks Φ12 and Φ13 and addresses, and outputs the same to the storage element 94 to enable the storage element 94 to steadily store the digital image output VB. To be more specific, the address generating circuit 95 counts the rising edges (the number of clocks) of the driving clock Φ11 while skipping one (some) in every certain numbers, and generates the clock Φ12 from the clock Φ11 in accordance with such skipping counting.

The storage element 94 is a random access memory having a capacity of at least 8 bit×2K=2 KB for temporarily storing data, or namely, image signals used in enlarging an image. The storage element 94 uses an address of at least 10-bit long ($A_0$–$A_9$), a writing control signal (memory write clock), a read control signal (memory read clock), and an 8-bit data input/output signal.

Here, to serve as address count clocks, the clock Φ11 and skipping clock Φ12 are supplied to the storage element 94 at the time of writing and reading, respectively, and the storage element 94 stores the count output as an address.

At the time of writing, image data are steadily stored into the storage element 94 per pixel. Whereas at the time of reading, since the addresses are generated based on the skipping clock Φ12, if the clock Φ12 skips one out of every five rising edges, the data at the addresses corresponding to the skipped rising edges, N–4, N, and N+4, are retrieved twice from the storage element 94.

A binary circuit 96 compensates image data VC retrieved from the storage element 94 and converts the same into binary data based on the clock Φ11. Thus, in the resulting binary data, one pixel is interpolated in every four pixels. This means the original image is enlarged at magnification 5/4=125%.

However, the above enlarged-scale image processing can not be realized without the storage element 94, and including the storage element 94 makes the image processing apparatus more complicated and expensive.

SUMMARY OF THE INVENTION

It is therefore an object of the present invention to provide an image processing apparatus which can perform enlarged-scale image processing in a simple manner at low costs.

To fulfill the above object, an image processing apparatus of the present invention is furnished with:

a photoreceiving element for, upon receipt of an image in the form of light, outputting an analog image signal serially based on a first clock, the analog image signal representing each pixel of the image;

a converting circuit for, upon input of the analog image signal, converting the analog image signal into a digital image signal based on a second clock; and a driving circuit for outputting the first and second clocks, rising edges in the first clock being skipped periodically with respect to rising edges in the second clock.

It is preferable that the photoreceiving element has an array of shift registers, for example, charge coupled devices.

According to the above arrangement, the driving circuit generates the first and second clocks in such a manner that the rising edges in the former are skipped periodically with respect to those in the latter. Thus, when the analog signal is outputted serially from the photoreceiving element based on the first clock and converted into the digital image signal by the converting circuit based on the second clock, the resulting digital image signal is extended in proportion to the skipping ratio.

In other words, since the photoreceiving element outputs the analog signal serially based on the first clock, the shift register in the photoreceiving element withholds the output of the analog image signal from the photoreceiving element where the rising edges are skipped in the first clock. As a result, when the analog image signal is converted into the digital image signal by the converting circuit based on the second clock, the digital image signal is outputted repetitively where the rising edges are skipped, thereby making it possible to generate the digital image signal for an enlarged image.

Thus, the present image processing apparatus obviates the storage element, which is indispensable in the conventional image processing apparatus for enlarged-scale processing. Therefore, not only the structure is simplified, but also the costs are reduced.

The driving circuit may include a switching circuit for, when setting a first region where the image is enlarged and a second region where the image is not enlarged, outputting the first clock for the first region, and a third clock for the second region, the third clock having more rising edges than the second clock.

According to the above arrangement, using the third clock having more rising edges than the second clock can speed up the operation of the photoreceiving element for the second region where the image is not enlarged. As a result, the overall processing time can be reduced to almost the same level as image processing at 1×magnification, meaning that a processing time prolonged by the enlarged-scale processing can be reduced.

The above object is also fulfilled by another image processing apparatus of the present invention furnished with:

a photoreceiving element for, upon receipt of an image in the form of light, outputting an analog image signal serially based on a first clock, the analog image signal representing each pixel of the image;

a converting member for, upon input of the analog image signal, converting the analog image signal into a binary signal based on a second clock; and a driving circuit for outputting the first and second clocks, rising edges in the first clock being skipped with respect to rising edges in the second clock.

According to the above arrangement, when the image processing apparatus is furnished with the converting member for converting the analog image signal into the binary signal, the image processing apparatus can also omit the storage element, which is indispensable in the conventional image processing apparatus for enlarged-scale processing. Thus, the image processing apparatus is simpler in structure and less expensive compared with the conventional image processing apparatus.

For a fuller understanding of the nature and advantages of the invention, reference should be made to the ensuing detailed description taken in conjunction with the accompanying drawings.

DESCRIPTION OF THE EMBODIMENTS (First Embodiment)

Figure 1:
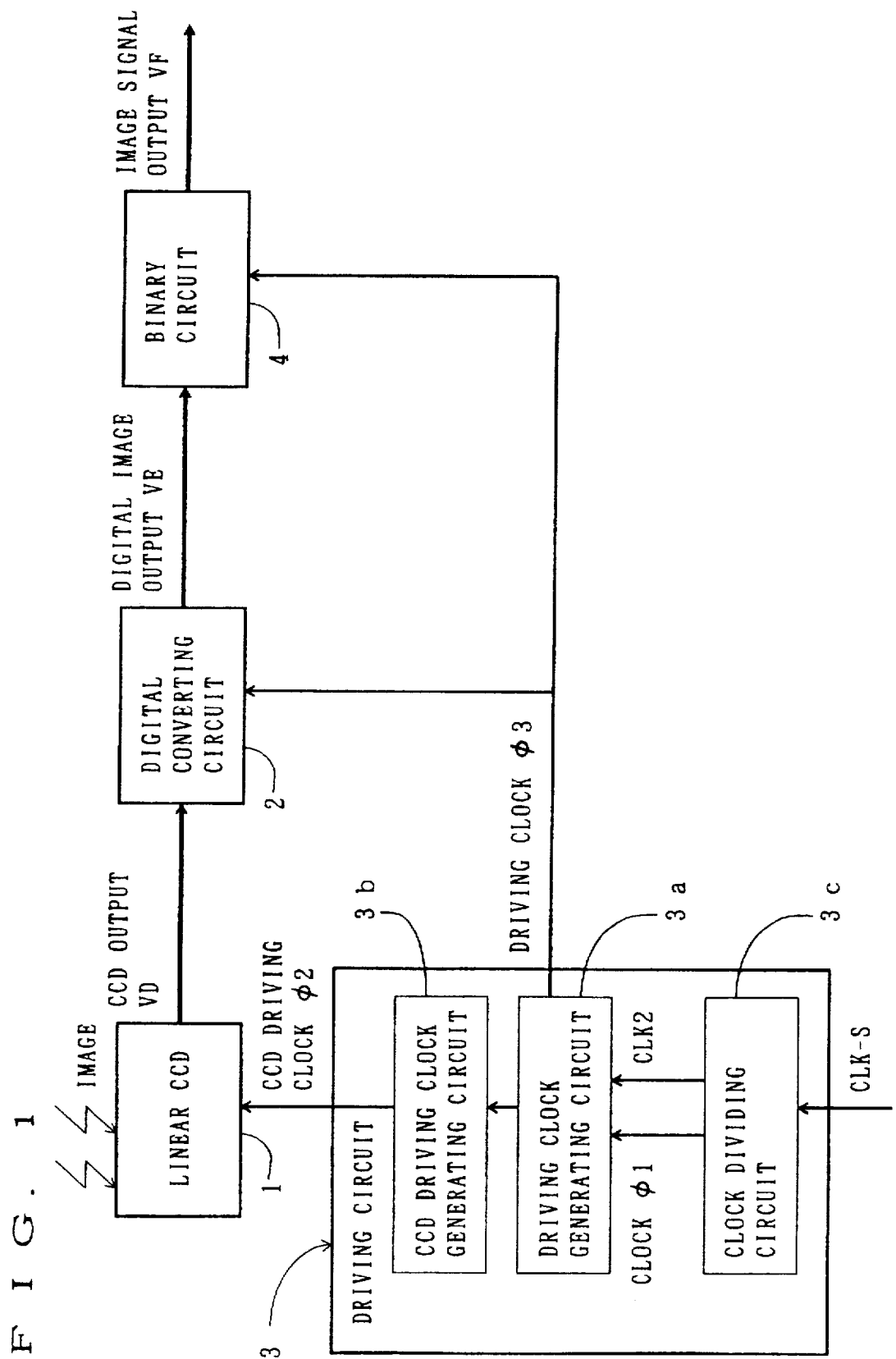
FIG. 1 is a block diagram of an image processing apparatus in accordance with a first example embodiment of the present invention.
Figure 2:
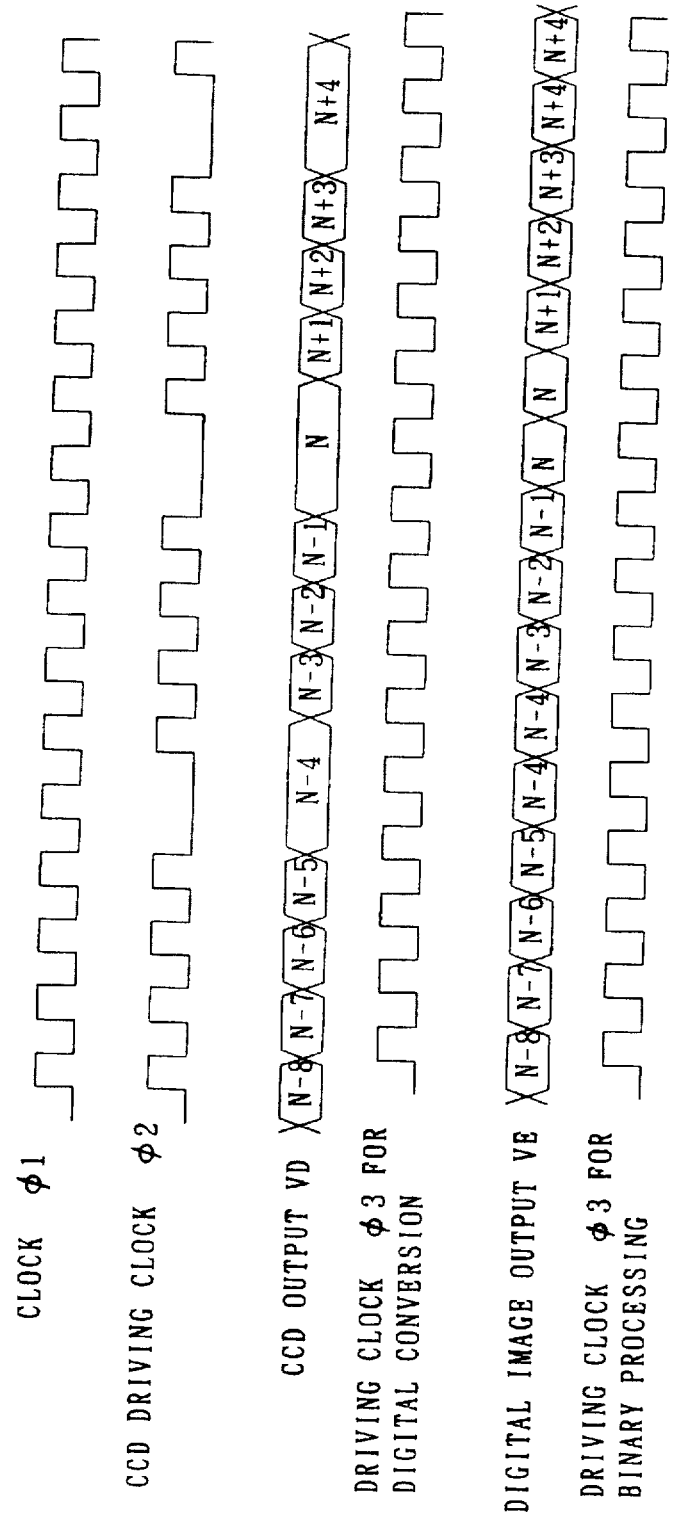
FIG. 2 shows a timing chart of the operation of each member in the above image processing apparatus for enlarged-scale processing.
Figure 3:
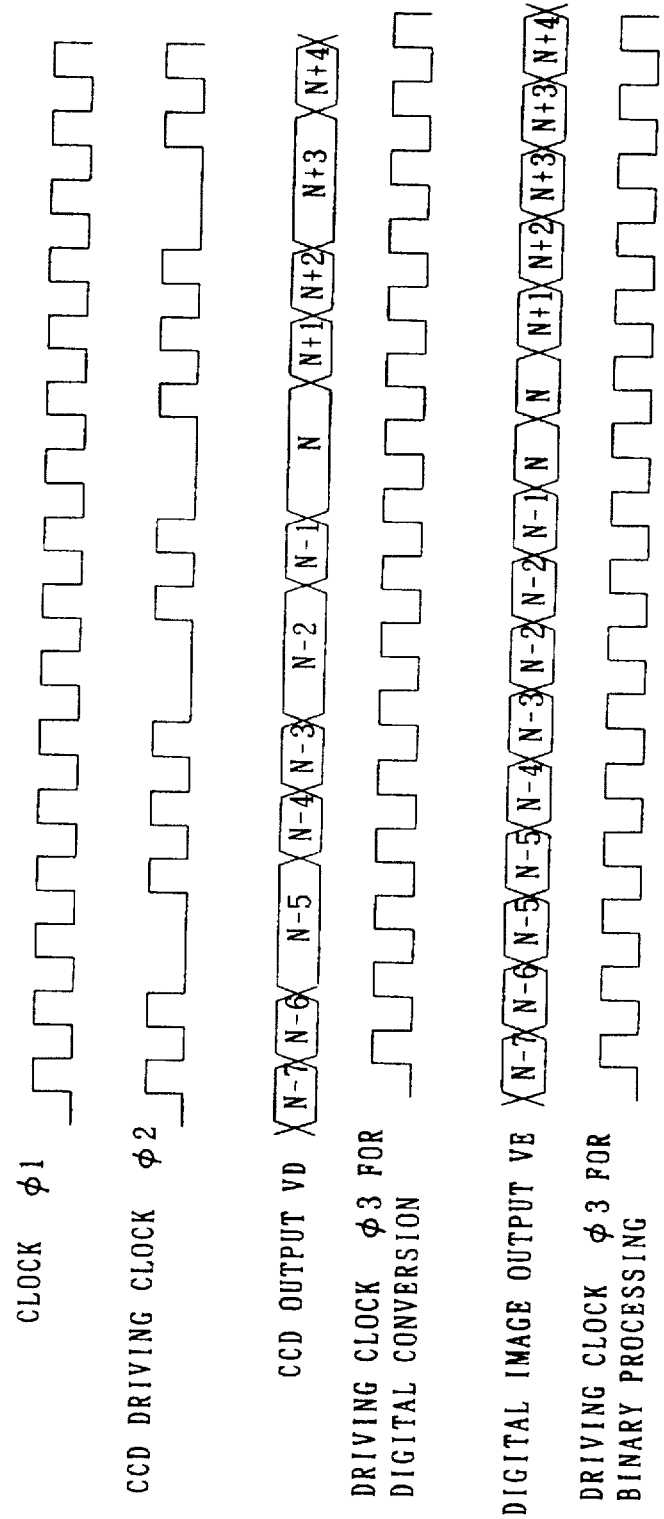
FIG. 3 shows another timing chart of the operation of each member in the above image processing apparatus for enlarged-scale processing.

Referring to FIGS. 1 through 3, the following description will describe a first example embodiment of the present invention.

As shown in FIG. 1, an image processing apparatus of the present embodiment, such as a facsimile machine and a digital copying machine, comprises a linear CCD 1 serving as a photoreceiving element, a digital converting circuit 2, and a driving circuit 3 serving as driving means.

To be more specific, the linear CCD 1 converts an image received in the form of light into an analog image signal representing each pixel, or CCD output VD, and outputs the same serially to the digital converting circuit 2. The digital converting circuit 2 converts the CCD output VD into a digital image signal, or digital image output VE. The driving circuit 3 generates a CCD driving clock Φ2 serving as a first clock for controlling the linear CCD 1 and a driving clock Φ3 serving as a second clock for controlling the digital converting circuit 2.

In case that the image processing apparatus is a facsimile machine, it further comprises a binary circuit 4 as a converting member for converting the digital image signal into a binary signal. Note that the binary circuit 4 can also convert the CCD output VD into the binary signal directly.

The linear CCD 1 is a linear array of a plurality of CCD elements, and it receives light to form an image thereon to further convert the resulting image into the CCD output VD. More precisely, the linear CCD 1 scans each pixel of the image per scanning line, for example from left to right, and outputs the CCD output VD from each CCD element serially over time based on the CCD driving clock Φ2.

The digital converting circuit 2 includes an A/D converter for receiving the CCD output VD and converting the same into the digital image output VE based on the driving clock Φ3.

The driving circuit 3 includes a CCD driving clock generating circuit 3b and a driving clock generating circuit 3a. The CCD driving clock generating circuit 3b receives a control signal, namely, clock Φ1, based on a system clock generated by a quartz oscillator or the like, and generates the CCD driving clock Φ2 based on the counting of the rising edges (the number of clocks) of the clock Φ1 to output the same to the linear CCD 1. The driving clock generating circuit 3a generates the driving clock Φ3 in the same manner, and outputs the same to the digital converting circuit 2.

To be more specific, the driving clock generating circuit 3a counts the rising edges of the clock Φ1 steadily and generates the driving clock Φ3 from the clock Φ1 in accordance with such skipping counting.

On the other hand, the CCD driving clock generating circuit 3b counts the rising edges of the clock Φ1 while skipping one (some) in every certain number, for example, one in every four rising edges, and generates the CCD driving clock Φ2 in accordance with such counting to extend an image signal.

Therefore, the rising edges of the CCD driving clock Φ2 are fewer than those of the driving clock Φ3 by the total number of the skipped rising edges of the clock Φ1.

Note that the term "clock" is generally understood as a binary electric signal having alternate high and low levels periodically. A high level and a low level makes one cycle and a time measured per cycle is defined as the time of one cycle, and one second divided by the time of one cycle is defined as a clock frequency.

Skipping one rising edge means that the signal is held at either level for another ½ cycle. Skipping two rising edges means that the signal is held at either level for another 2×½ cycle, namely, another full cycle.

Next, the operation of the present image processing apparatus will be explained.

In the first place, the clock Φ1 is inputted into the driving circuit 3, which, in response, generates the CCD driving clock Φ2 and outputs the same to the linear CCD 1. Accordingly, the linear CCD 1 serially outputs the CCD output VD in the form of an analog signal to the digital converting circuit 2 based on the CCD driving clock Φ2.

Here, a shift register incorporated in the linear CCD 1 is suspended until the rising edge of the CCD driving clock Φ2 is inputted, and the output of the CCD output VD from the linear CCD 1 is withheld under these conditions.

Exploiting such characteristics of the linear CCD 1 makes it possible to enlarge an original image when the linear CCD 1 outputs the CCD output VD. For example, assume that the driving circuit 3 generates the CCD driving clock Φ2 by skipping one in every four rising edges of the clock Φ1. Then, when the linear CCD 1 is controlled by the CCD driving clock Φ2 thus generated, the output of the data at the (N−4)'th, N'th, (N+4)'th, ... pixels in the CCD output VD is withheld as shown in FIG. 2.

Upon receipt of the CCD output VD thus generated, the digital converting circuit 2 steadily converts the same into the digital image output VE in sync with the driving clock Φ3 and outputs the resulting digital image output VE to the binary circuit 4. Thus, one pixel is interpolated in every four pixels, or where the rising edges are skipped, in the resulting digital image output VE. Consequently, the original image is enlarged to magnification 5/4=125%.

Next, a case where the original image is enlarged to different magnification will be explained. Here, one in every three (M) rising edges of the clock Φ1 is skipped first, and thence, one in every four (N) rising edges of the clock Φ1 is skipped, so that the original image is enlarged to magnification (M+N)/(M+N−2).

When the linear CCD 1 is controlled by the CCD driving clock Φ2 generated in the above manner, the output of the data at (N−5)'th, (N−2)'th, N'th, (N+3)'th, ... pixels in the CCD output VD from the liner CCD 1 is withheld as shown in FIG. 3.

Upon receipt of the CCD output VD thus generated, the digital converting circuit 2 steadily converts the same into the digital image output VE in sync with the driving clock Φ3 and outputs the digital image output VE to the binary circuit 4.

Thus, one in every four pixels first and thence one in every three pixels are interpolated, or where the rising edges are skipped, in the resulting digital image output VE. Consequently, the original image is enlarged to magnification 7/5=140%.

The image processing apparatus of the present embodiment arranged as above obviates the storage element and its driving circuit, which are indispensable in the convectional image processing apparatus for enlarged-scale processing. Thus, not only the structure can be simplified, but also the costs can be reduced. In addition, since the above image processing apparatus can omit the writing and reading operations with respect to the storage element, the same can speed up the enlarged-scaling processing compared with the conventional image processing apparatus.

(Second Embodiment)

Figure 4:
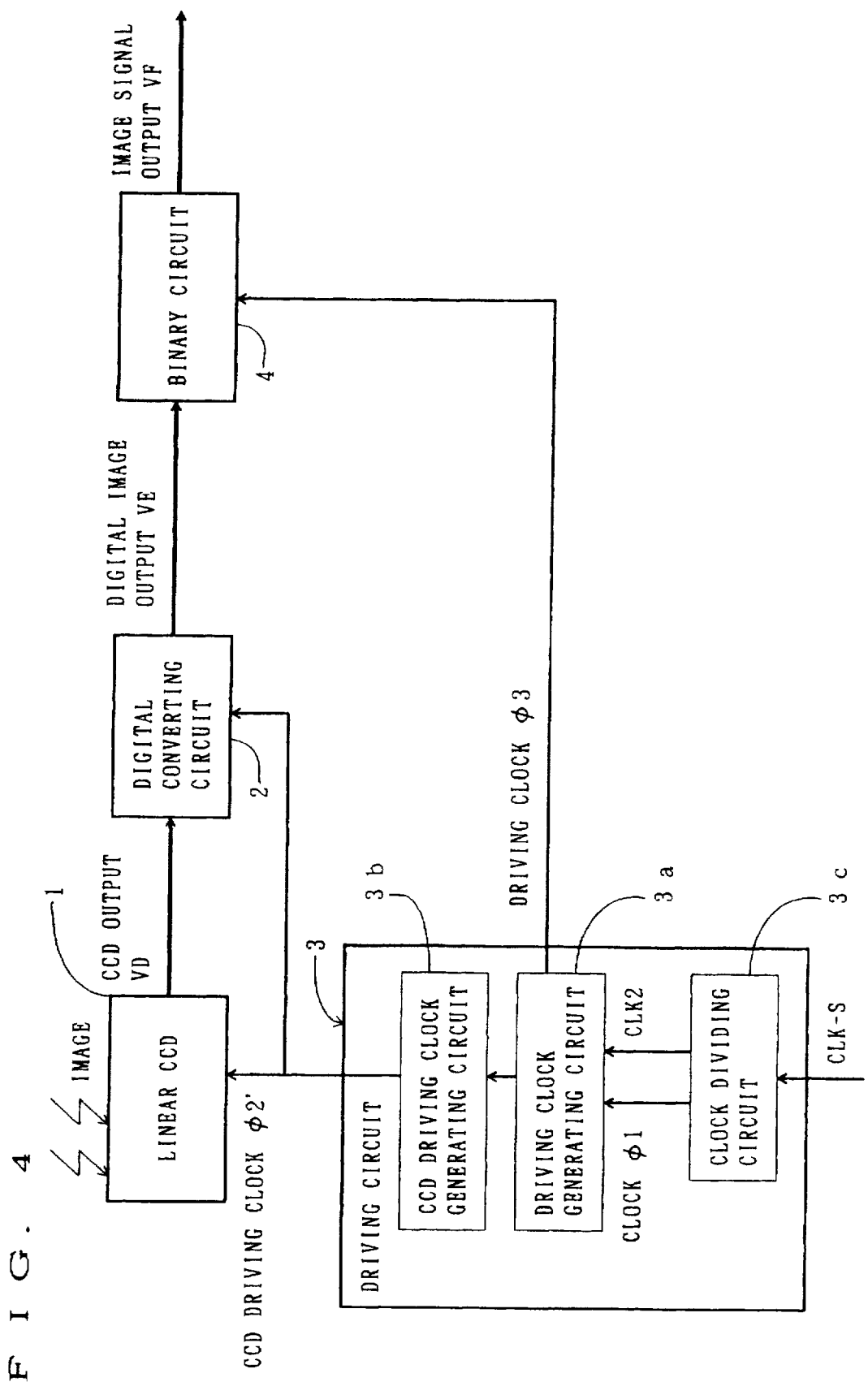
FIG. 4 is a block diagram of an image processing apparatus in accordance with a second example embodiment of the present invention.
Figure 5:
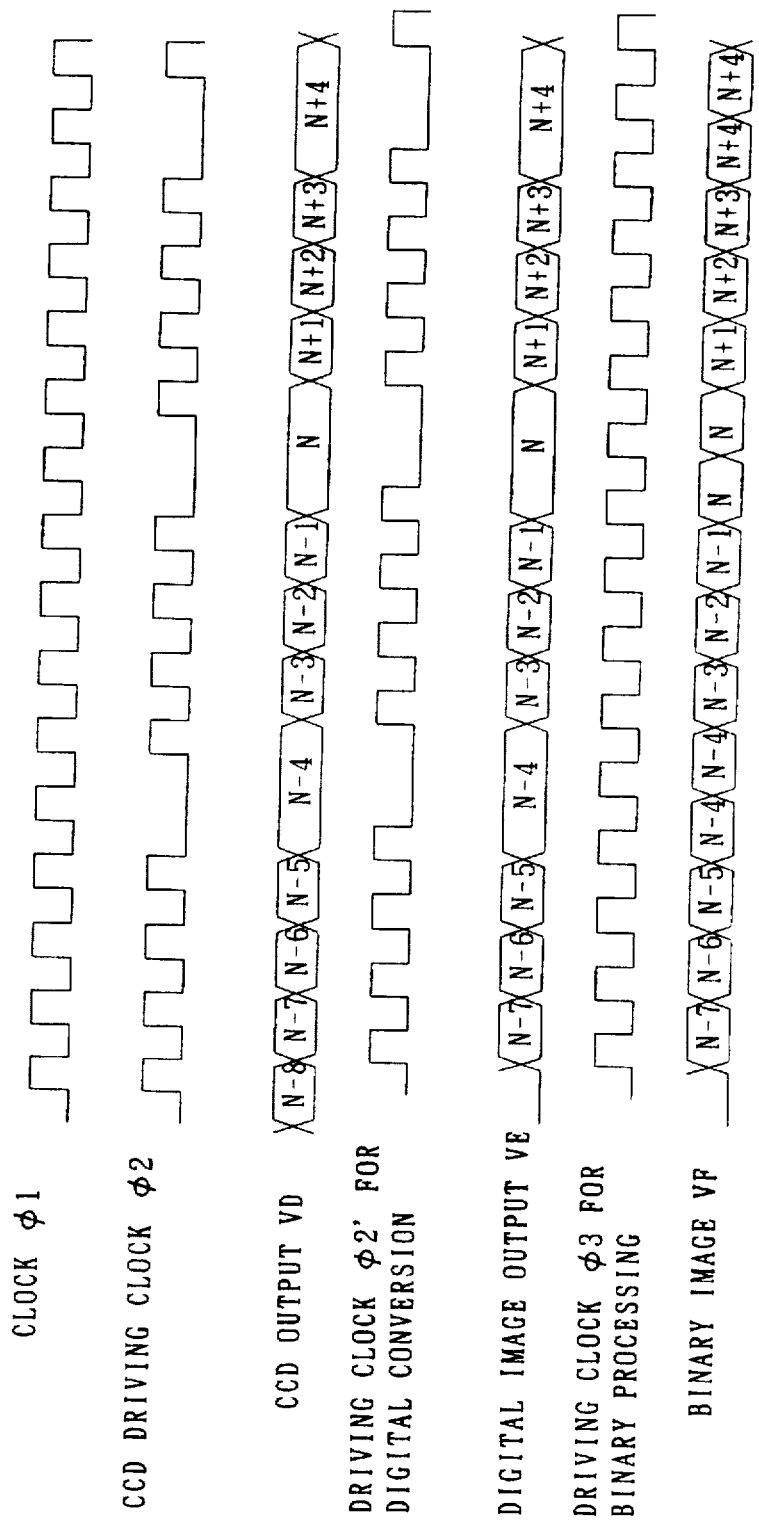
FIG. 5 shows a timing chart of the operation of each member in the above image processing apparatus for enlarged-scale processing.
Figure 6:
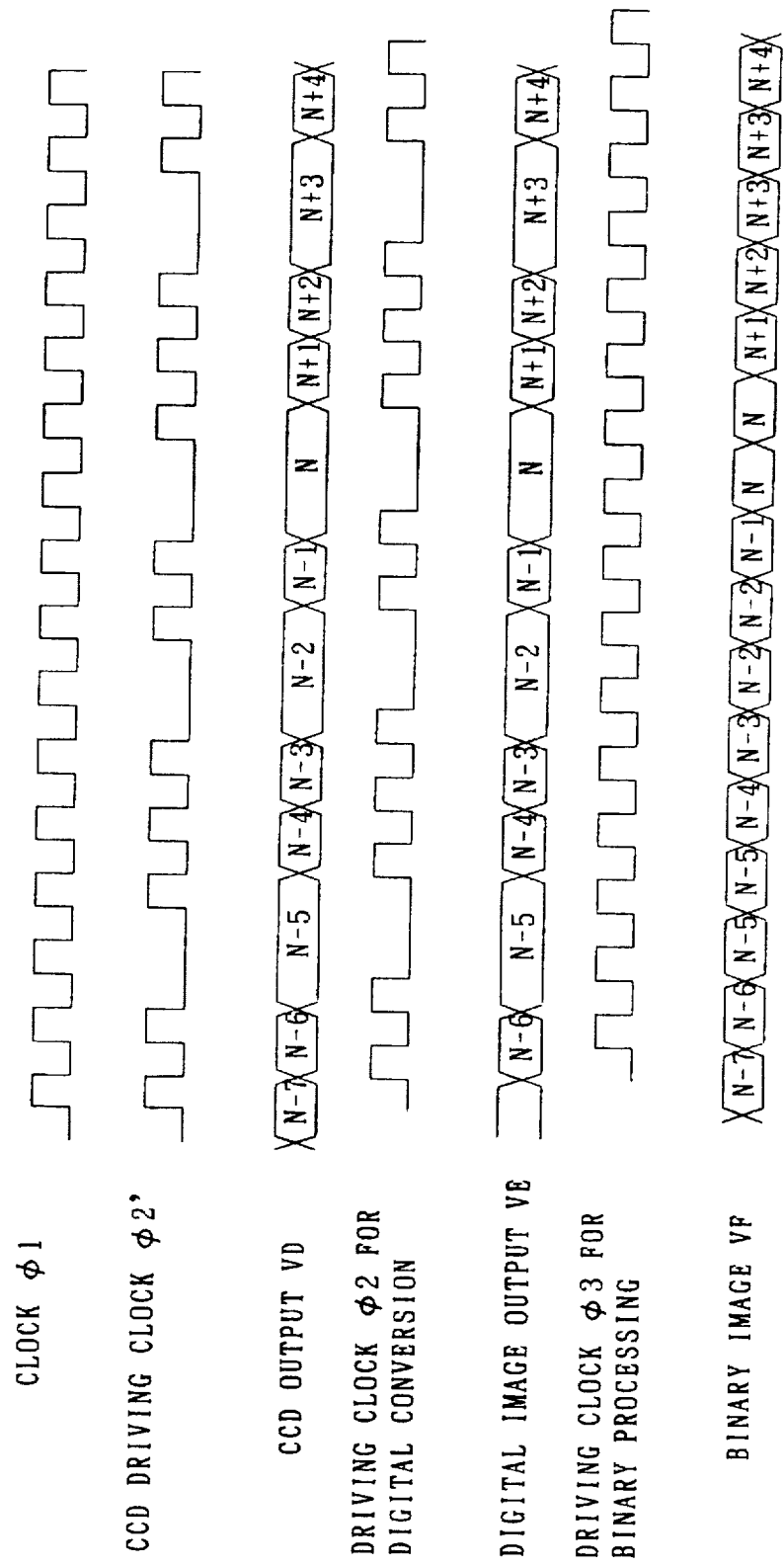
FIG. 6 shows another timing chart of the operation of each member in the above image processing apparatus for enlarged-scale processing at different magnification.

Referring to FIGS. 4 through 6, the following description will describe a second example embodiment of the present invention. Hereinafter, like components are labeled with like reference numerals with respect to the first embodiment, and the description of these components is not repeated for the explanation's convenience.

As shown in FIG. 4, the present image processing apparatus is identical with the counterpart in the first example except that (1) the driving clock Φ3 is inputted into the binary circuit 4 as a fourth clock, so that, upon receipt of the digital image output VE, the binary circuit 4 serving as a converting member converts the same into a binary signal used for a facsimile machine or the like, and (2) the CCD driving clock Φ2' is inputted into the digital converting circuit 2 instead of the driving clock Φ3.

Assume that the image processing apparatus enlarges an original image to 125%. Then, as shown in FIG. 5, a driving clock Φ2', which skips in the same manner as the driving clock Φ2, is inputted into the digital converting circuit 2. Accordingly, the digital converting circuit 2 converts the CCD output VD inputted from the linear CCD 1 into the digital image output VE based on the driving clock Φ2'. As a result, the output of the digital image output VE is withheld where the rising edges are skipped.

The binary circuit 4 converts the digital image output VE thus generated into binary data based on the non-skipping driving clock Φ3. Then, pixels are interpolated into the resulting binary data where the rising edges are skipped. Therefore, the original image is enlarged in the same manner as was done by the counterpart in the first embodiment in which the driving clock Φ3 is inputted into the digital converting circuit 2.

As shown in FIG. 6, the present image processing apparatus, like the counterpart in the first embodiment, can also enlarge the original image to another magnification, for example, 140%, using the binary circuit 4.

(Third Embodiment)

Figure 7:
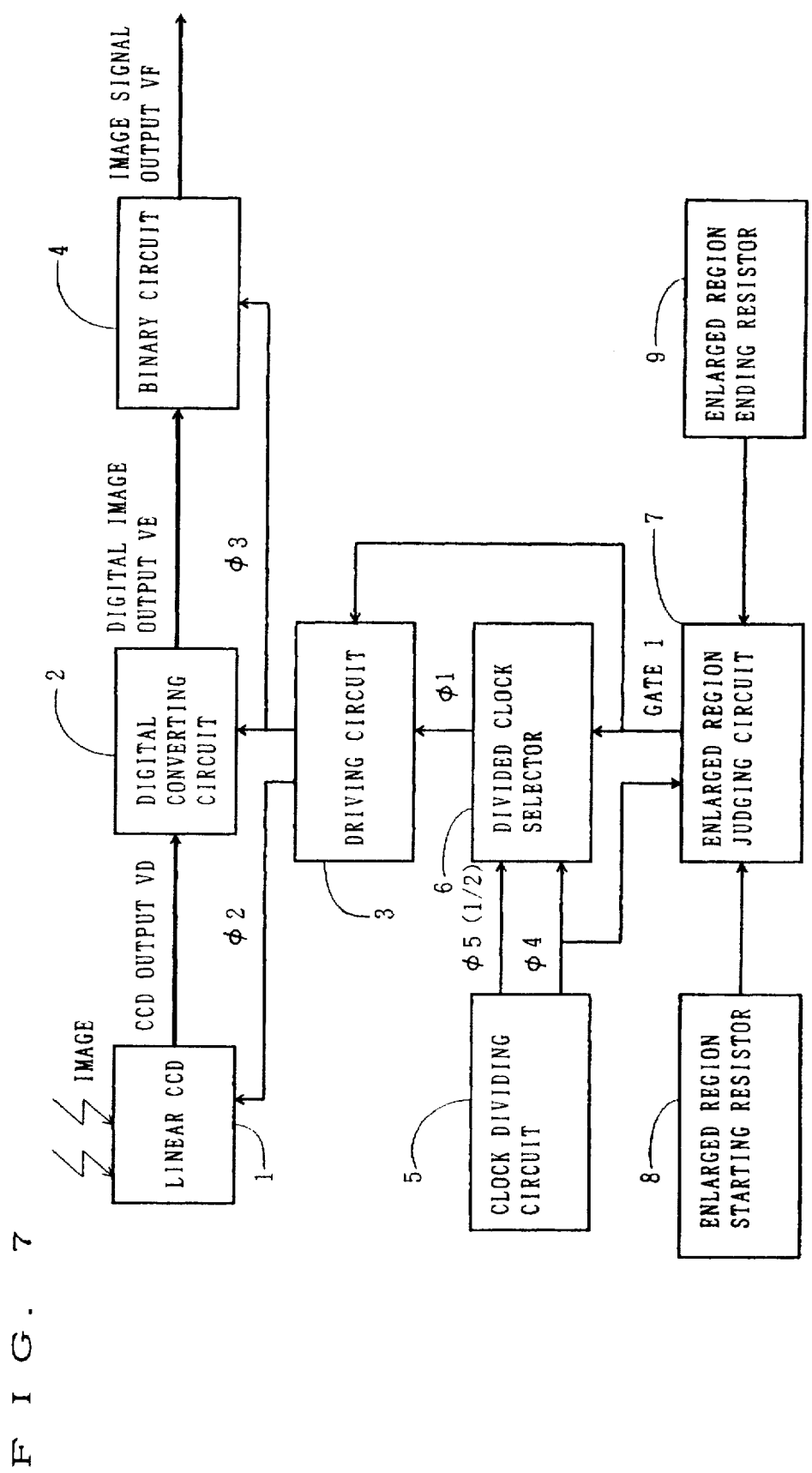
FIG. 7 is a block diagram of an image processing apparatus in accordance with a third example embodiment of the present invention.
Figure 8:
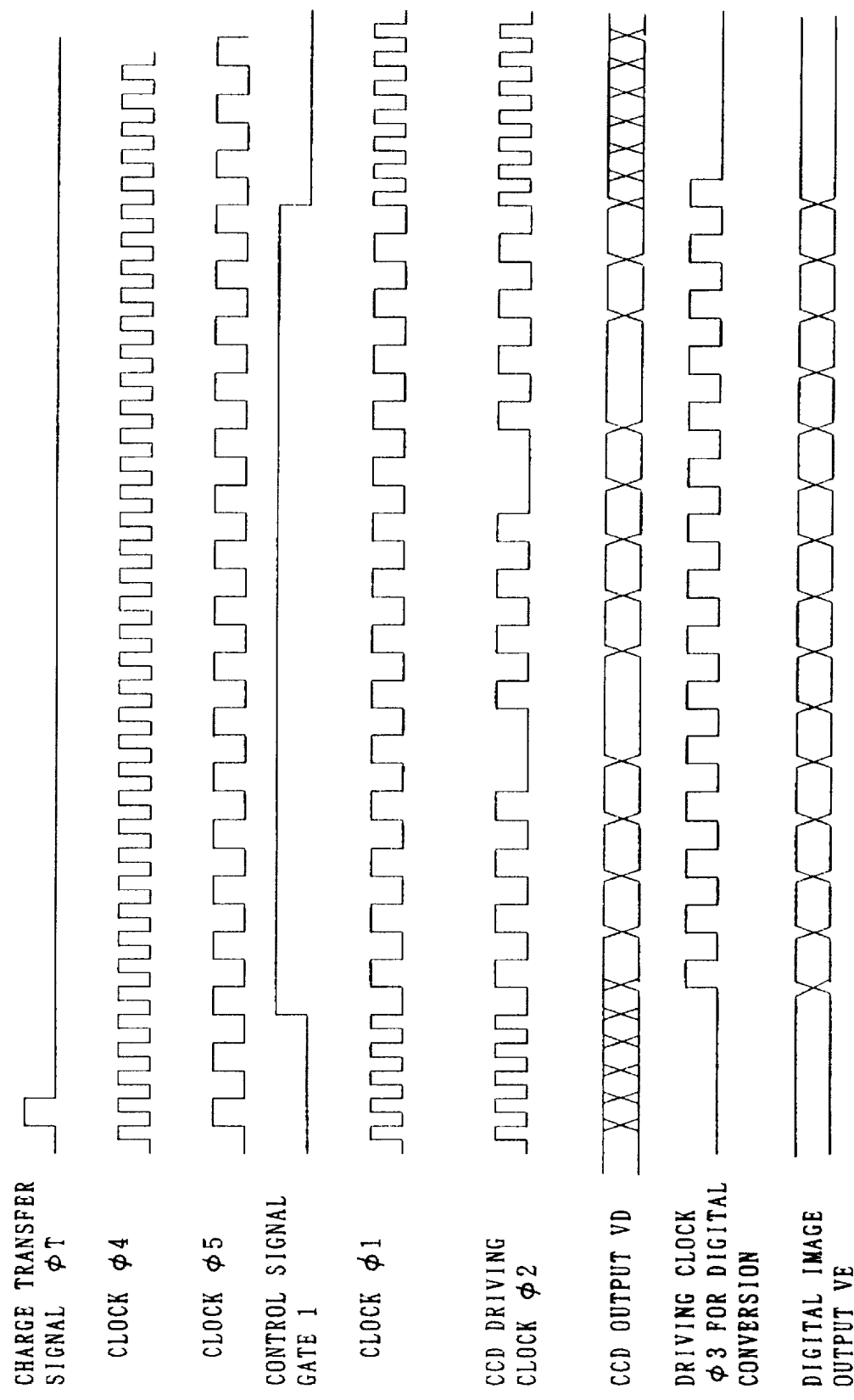
FIG. 8 shows a timing chart of the operation of each member in the above image processing apparatus for enlarged-scale processing.

Referring to FIGS. 7 and 8, the following description will describe a third example embodiment of the present invention. Hereinafter, like components are labeled with like reference numerals with respect to the first embodiment, and the description of these components is not repeated for the explanation's convenience.

The image processing apparatuses of the first and second embodiments can process only a limited range of an image signal due to the memory capacity or the like. Thus, the larger the magnification, the smaller the region the image processing apparatus can enlarge. To eliminate this problem when the main scanning and the control of the same are carried out periodically by the linear CCD 1 during the reading operation, high-speed image processing such that satisfies the following relationship is required: $c_1 < c/d$, where $c_1$ is a time the linear CCD 1 takes to output an image of one pixel in a non-enlarged region, c is a time the linear CCD 1 takes to output an image of one pixel, and d is magnification to which the original (read) image is enlarged.

To be more specific, besides the above defined $c_1$, c, and d, let a be the main scanning length of the original image, b be the processing time a reading device takes per one scanning line, e be a width of the region where the original image is enlarged, and f be the main scanning resolution (pixel/mm). Then, in case of the enlarged-scale processing, pixels are interpolated in the e-wide region enlarged to magnification d and the total number of the pixels in the e-wide region is calculated as, d×e×f, while the number of pixels in the non-enlarged region is calculated as, (a−e)×f, making the total of f×(a−e+d×e). On the other hand, the number of the pixels of the original image is calculated as, f×a×c. Thus, when the original image is enlarged, the number of pixels is increased by f×(d−1)×e×c.

To cancel out the processing time for the increased number of the pixels in the overall processing time, the image in the non-enlarged region must be processed at higher speeds.

More specifically, the image processing in the non-enlarged region is expressed as: f×a×$c_1$+f×(d− 1)×e×c=f× (a×$c_1$+(d−1)×e×c).

Here, the above processing must not take longer than the processing time for the non-enlarged case. Thus, the following relationship, f×(a×$c_1$+(d−1)×e×c)<f×a×c, and hence, $c_1$< (a−(d−1)×e)×c/a must be satisfied.

When the recording processing is taken into consideration, the region subject to enlargement is often enlarged to the upper limit of the width of the recording region. Thus, given that the processing speed is a=d×e if the reading width and recording width are equal, the processing speed for the non-enlarged region must be $c_1$<(d×e−(d−1)× e)×c/d×e, and hence, $c_1$<c/d.

For example, in the enlarged region, let d=2 and c=1 μsec:1 MHz, then in the non-enlarged region, we get $c_1$=0.5 μsec (2 MHz), that is, the linear CCD 1 must be arranged to output image per pixel at 0.5 μsec (2 MHz) at maximum.

Thus, as shown in FIG. 7, the present image processing apparatus further comprises a clock dividing circuit 5 for dividing the system clock and output the same to their respective destination components compared with the counterparts in the above embodiments. For example, the clock dividing circuit 5 divides a clock Φ4 (clock frequency: 2 MHz) to generate a clock Φ5 (clock frequency: 1 MHz) and output the same to their respective destination components.

Accompanying with the clock dividing circuit 5, the present image processing apparatus further comprises a clock selector 6 serving as switching means for receiving both the clocks Φ4 and Φ5 from the clock dividing circuit 5 and selectively outputting either clock. The present image processing apparatus further comprises a region judging circuit 7 for controlling the clock selector 6 by counting the rising edges of the input clock Φ4 from the clock dividing circuit 5 upon receipt of the same.

The present image processing apparatus further comprises an enlarged region starting register 8 and an enlarged region ending register 9 for storing count values used by the region judging circuit 7 when judging the enlarged region.

The region judging circuit 7 counts the rising edges of the clock Φ4 from the clock dividing circuit 5, and compares the latest count value with a starting value (STR) preset in the enlarged region starting register 8 and an ending value (END) preset in the enlarged region ending register 9. When the count value exceeds the starting value (STR), the region judging circuit 7 sets a control signal (GATE 1) to the high level to indicate the enlarged region. On the other hand, when the count value exceeds the ending value (END), the region judging circuit 7 sets the control signal (GATE 1) to the low level.

The clock selector 6 is controlled by the control signal (GATE 1) to supply the clock Φ1 having a plurality of clock frequencies to the driving circuit 3.

As shown in FIG. 8, the driving circuit 3 generates the CCD driving clock Φ2 as a third clock while counting the rising edges of the control signal (GATE 1) in the following manner. When the control signal (GATE 1) is in the high level, the driving circuit 3 skips the rising edges of the clock Φ1 or those of the divided clock Φ1. Whereas the driving circuit 3 outputs the clocks Φ1 intact as the CCD driving clock Φ2 to enable the high-speed release, or readout, of the CCD output VD in the non-enlarged region. This arrangement makes it possible to retrieve the CCD output VD from the linear CCD 1 within a time required to process the image per line in the normal operation.

The digital converting circuit 2 converts the CCD output VD thus retrieved into digital data based on the driving clock Φ3. Then, the pixels are interpolated where the rising edges are skipped in the resulting digital image output VE based on the CCD driving clock Φ2, so that the data are enlarged to the specified magnification in the region where the control signal (GATE 1) is set to the high level.

Each of the registers 8 and 9 may be set manually. For example, the paper size is changed to the Japanese standard A4 from B5, or the enlarged portions may be set in advance, for example, the upper half of an A4 document, so that the user can select a desired region from the list of the predetermined enlarged portions.

Further, the enlarged portion and non-enlarged portion may be set automatically when the size of the document in the scanner and a desired copy sheet are different, for example, when the original document is B5 while the desired copy sheet is A4.

For further understanding, each component of the image processing apparatuses of the first through third embodiments will be explained with reference to FIGS. 9 through 22.

Figure 9:
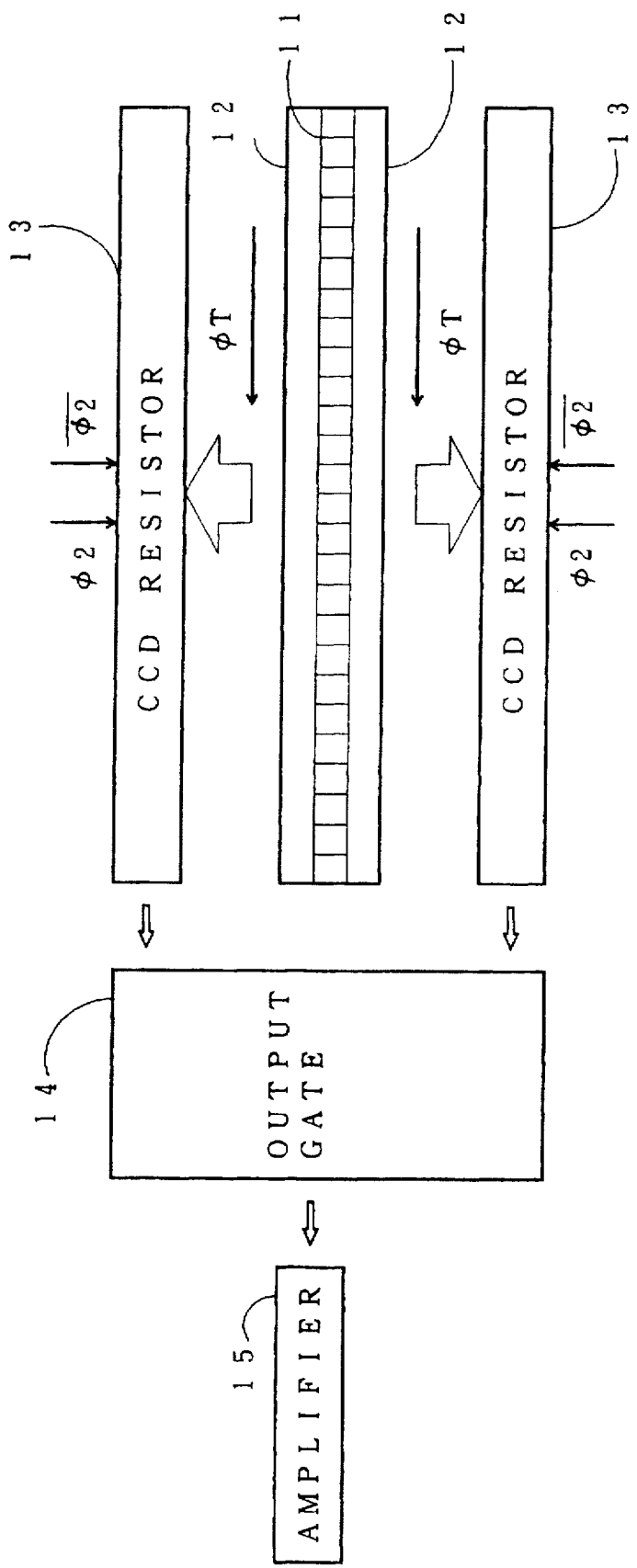
FIG. 9 is a view depicting a structure of a linear CCD of the above image processing apparatus.

As shown in FIG. 9, the linear CCD 1 is a CCD image sensor comprising a linear array of photodiodes (photoelectrical converting section) 11, and two photo-gates (charge transferring paths) 12 sandwiching the photodiodes 11 at the top and bottom, and two linear array CCD shift registers (registers made of charge coupled devices) 13 sandwiching the aforementioned layered components in a vertical direction.

Figure 10:
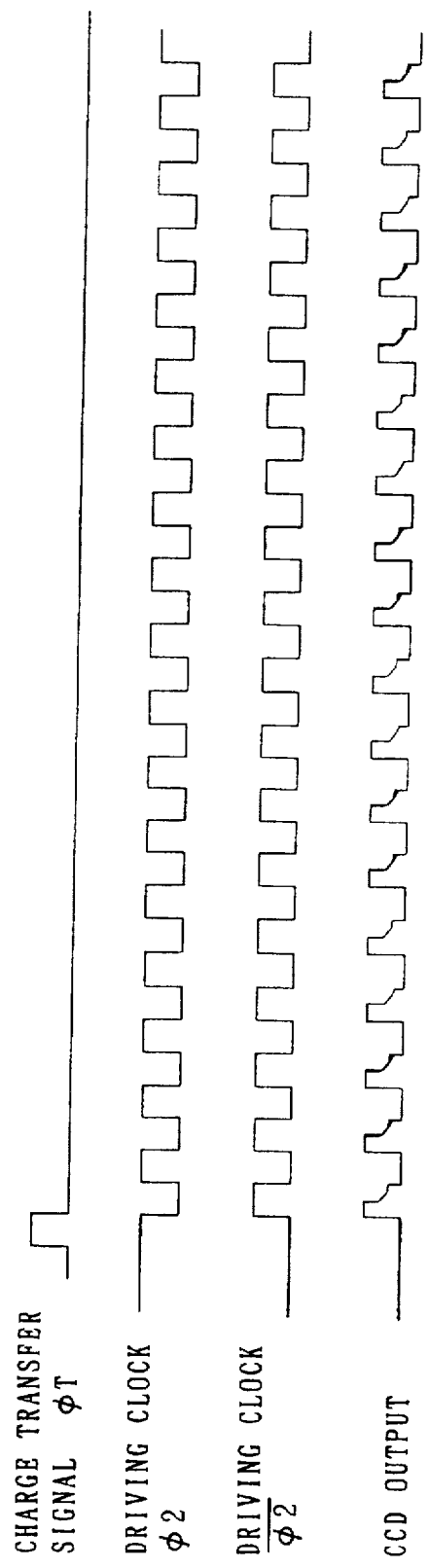
FIG. 10 shows a timing chart of the above linear CCD.

Incident light on the linear CCD 1 is converted photoelectrically by the photodiodes 11, and the charges of the resulting electric signal is stored in the photo-gates 12. As shown in FIG. 10, the stored charges are selectively sent to the two CCD registers 13 based on the odd-even alternation by a charge transfer signal ΦT. The charges are further transferred per bit within each CCD register 13 to an output gate 14 by transfer signals Φ2 and $\overline{\Phi 2}$ serving as the CCD driving clock.

The charges outputted from each CCD register 13 through the output gate 14 are restored in the original order based on the odd-even alternation, and amplified by an output amplifier 15 in the latter stage and outputted to the digital converting circuit 2.

The output from the linear CCD 1 generated in the above manner contains some switching noise (FIG. 10); however, such switching noise is removed during the sampling processing in the latter stage.

Figure 11:
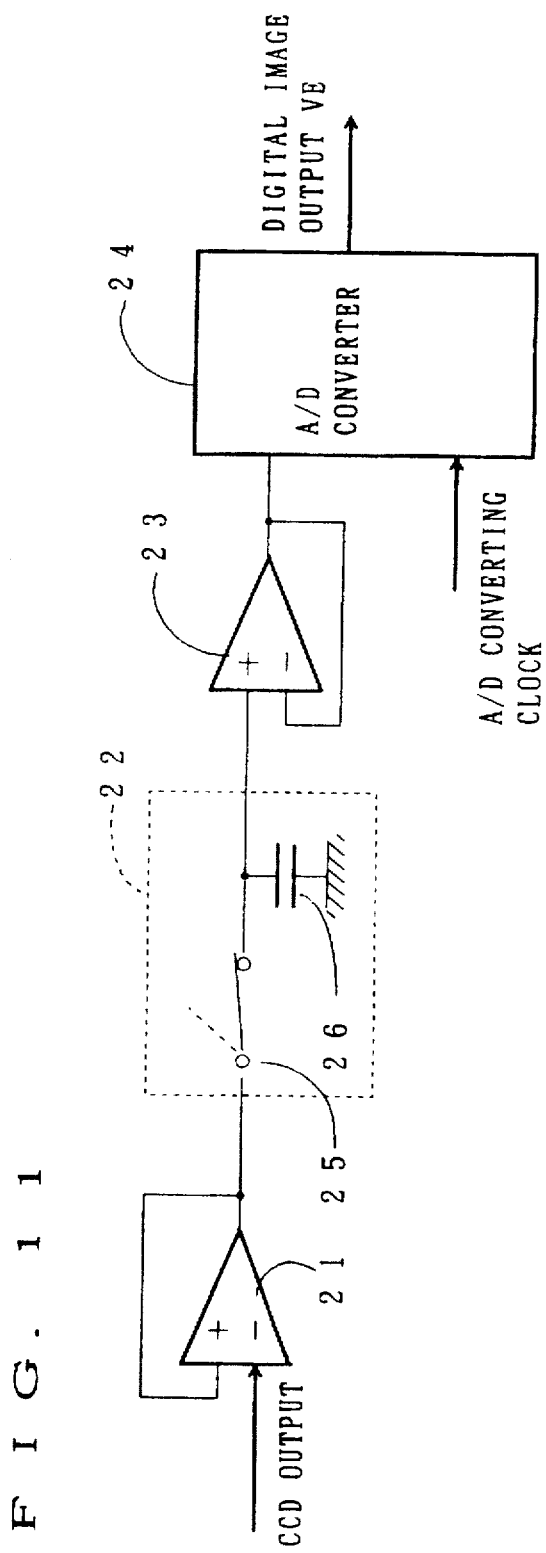
FIG. 11 is a block diagram of a digital converting circuit of the above image processing apparatus.

Thus, as shown in FIG. 11, the digital converting circuit 2 comprises a buffer amplifier 21, a sampling circuit 22, another buffer amplifier 23, and an A/D converter 24. To be more specific, the CCD output VD is inputted to the buffer amplifier 21, and a signal therefrom is inputted into the sampling circuit 22 and the noise in the CCD output VD is removed herein. A noise-free signal from the sampling circuit 22 is inputted to the buffer amplifier 23, which in response outputs an analog signal to the A/D converter 24. The A/D converter 24 converts the input analog signal into multi-data (digital data), namely, the digital image output VE, and outputs the same to the binary circuit 4. In all the block diagrams beyond FIG. 11, a black dot means electrical connection between two intersecting lines.

Each of the buffer amplifiers 21 and 23 is an operation amplifier, and the output therefrom is fed back to either input terminal of its own. According to this arrangement, the gain is set to 1, so that the output impedance is lowered to stabilize the operation of the sampling circuit 22 and A/D converter 24 in the latter stage.

The sampling circuit 22 comprises an analog switch 25 for switching ON/OFF state of a signal from the CCD output VD based on a sampling clock, and a capacitor 26 for storing charges while the analog switch 25 is turned ON. This arrangement makes it possible to sample the effective output portions of the CCD output VD through the ON/OFF action control of the analog switch 25 based on the sampling clock, and as a result, the switching noise contained in the CCD output VD is removed.

Figure 12:
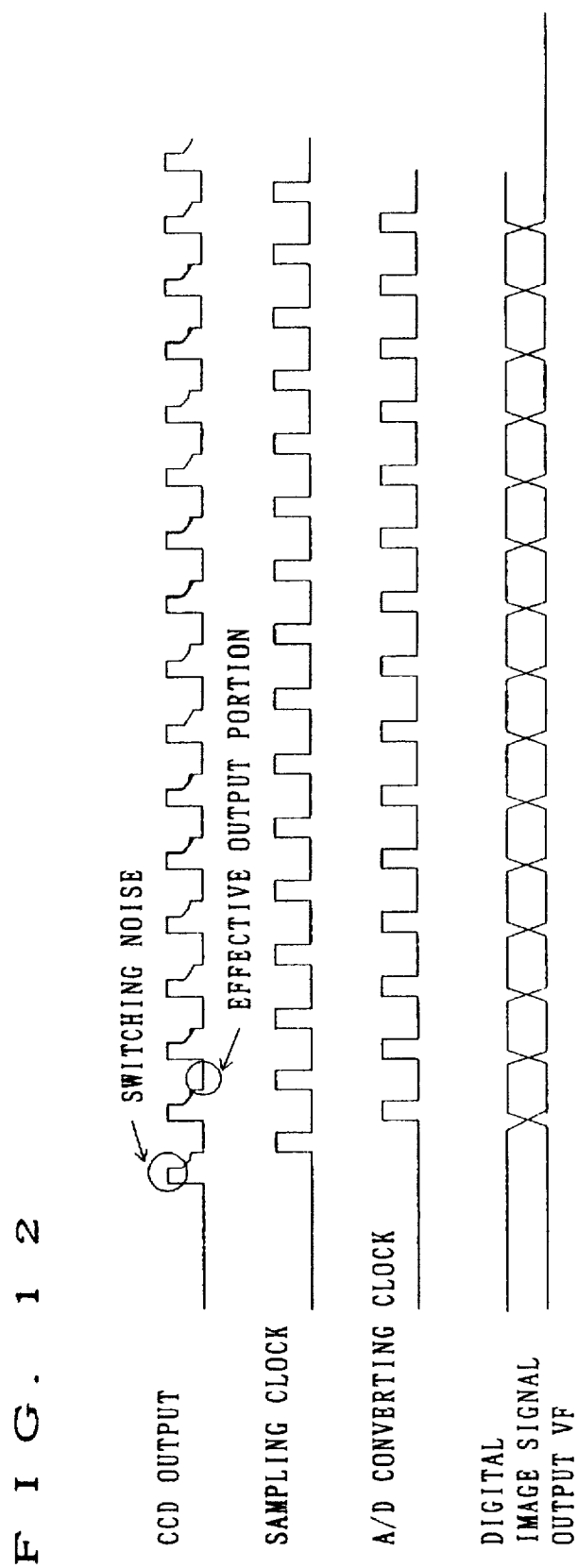
FIG. 12 shows a timing chart of the above digital converting circuit.

More specifically, the CCD output VD is generated based on the clock Φ2 as previously mentioned. Thus, as shown in FIG. 12, the rising edge of the sampling clock is set in sync with the starting point of the predicted effective output region in the CCD output VD. On the other hand, the driving clock Φ3 serving as the A/D converting clock is set in sync with the starting point of the predicted effective output region in the output from the sampling circuit 22, which is delayed by the capacitor 26 and buffer amplifier 23.

Due to the above arrangement, the CCD output VD is inputted into the digital converting circuit 2 after the switching noise is removed completely, thereby ensuring the digital conversion of the CCD output VD.

Figure 13:
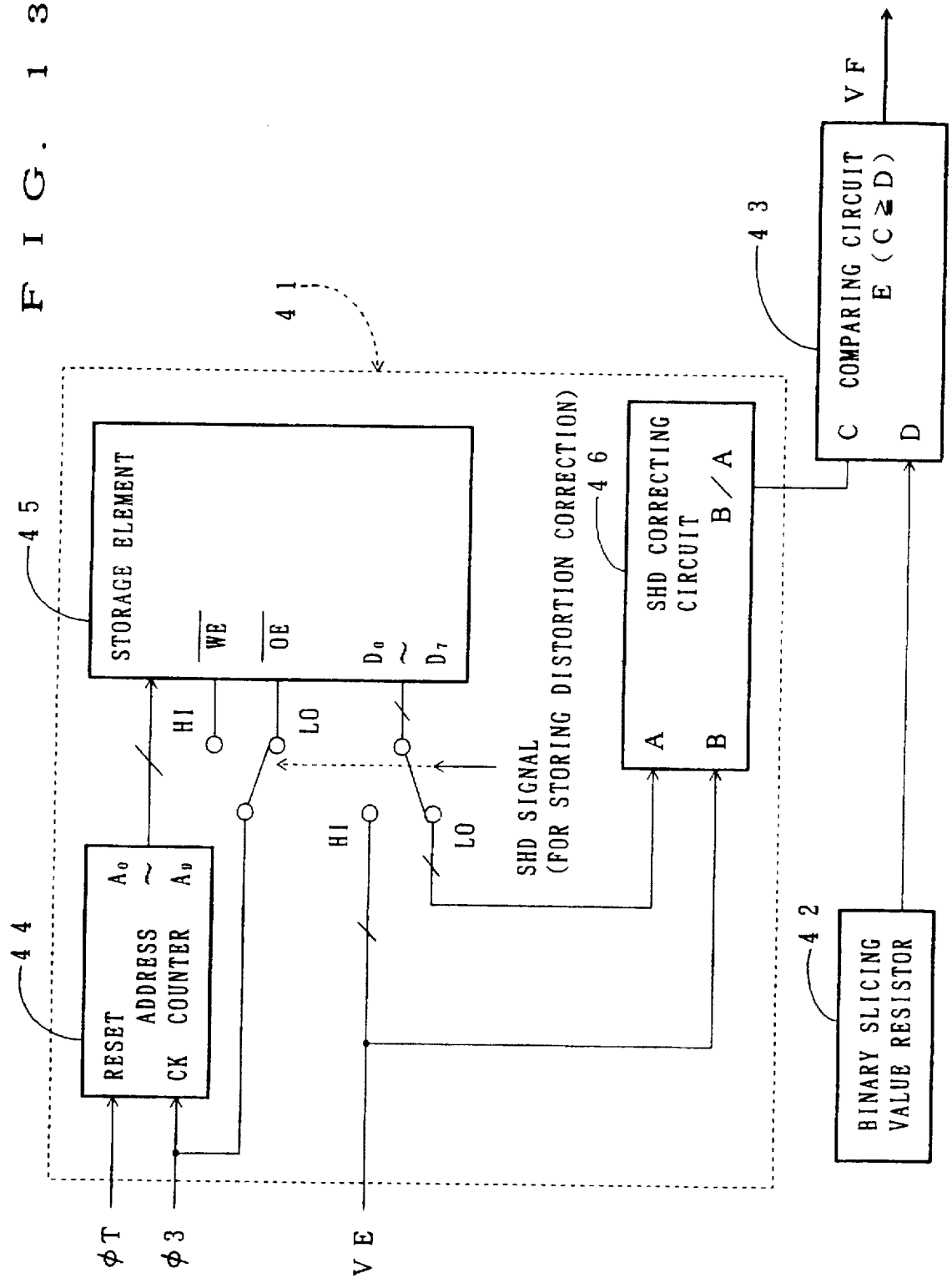
FIG. 13 is a block diagram of a binary circuit of the above image processing apparatus.

As shown in FIG. 13, the binary circuit 4 comprises an optical distortion correcting circuit 41, a binary slicing value register 42, and a comparing circuit 43 for monochrome judgement.

The optical distortion correcting circuit 41 comprises an address counter 44, a storage element 45, and a correcting circuit 46. The address counter 44 counts an address for correcting shading, or the output distortion caused by a drop in a light amount around a microlens forming an image in the linear CCD 1 and outputs the address to the storage element 45. The storage element 45, such as a RAM, stores the distortion correcting data for correcting the shading in the digital image output VE at the address outputted from the address counter 44. The correcting circuit 46 corrects the shading in the digital image output VE by dividing the digital image output VE by the above correcting data.

In the binary circuit 4, the comparing circuit 43 compares the digital image output from the correcting circuit 46 with the judging standard level preset in the binary slicing value register 42 to output the binary data.

Figure 14:
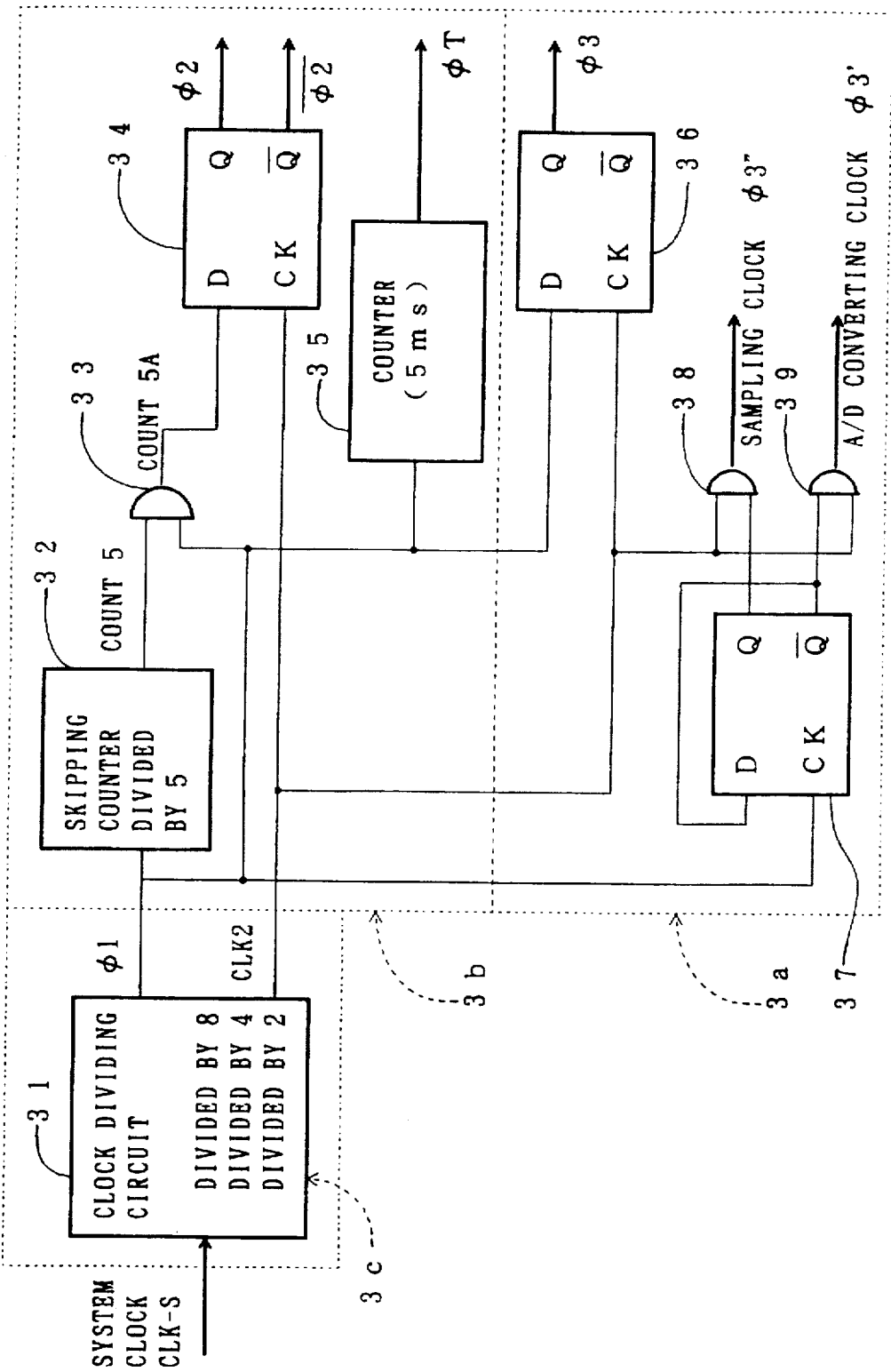
FIG. 14 is a block diagram of a driving circuit of the above image processing apparatus in accordance with the first embodiment.
Figure 15:
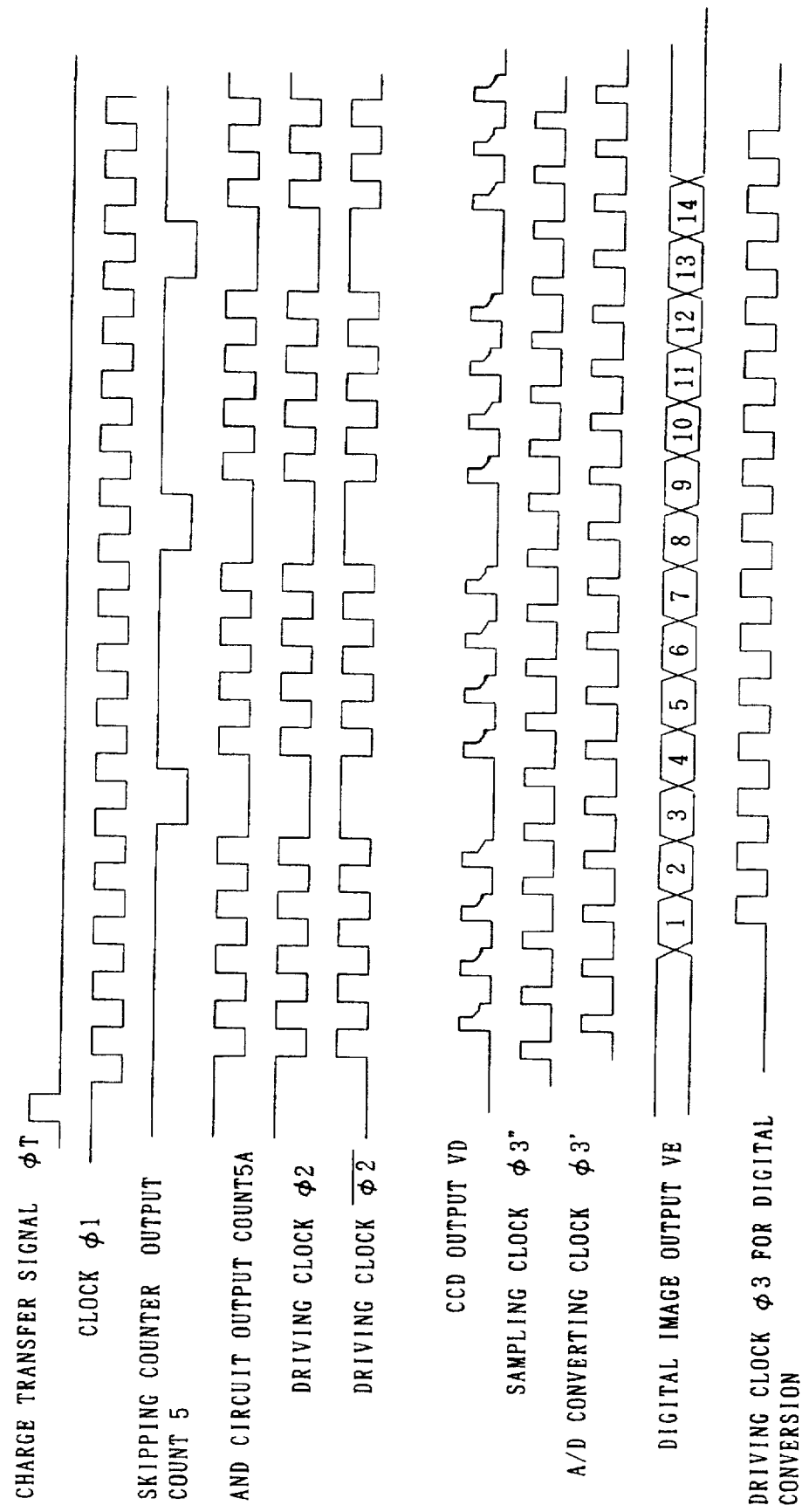
FIG. 15 shows a timing chart of the above driving circuit.

As shown in FIGS. 14 and 15, the driving circuit 3 of the first embodiment includes a clock dividing circuit 31 for dividing the system clock (CLK-S) by 8 to output the clock (Φ1) and by 2 to output the timing adjusting clock (CLK-2).

A skipping counter 32 counts the rising edges of the clock Φ1 and generates a skipping signal (COUNT 5) skipping one in every five rising edges. Accordingly, an AND circuit 33 outputs an AND of the skipping signal (COUNT 5) and the clock Φ1 as another skipping clock (COUNT 5A).

Then, a flip-flop 34 adjusts the timing of the skipping clock (COUNT 5A) using the timing adjusting clock (CLK-2), or the clock divided by two, to generate a CCD driving clock $\overline{\Phi 2}$, or an inverse of the above CCD driving clock Φ2.

A counter 35 counts the rising edges of the clock Φ1 inputted therein to generate the charge transfer signal ΦT having pulses rising in every 5 ms and supplies the same to the linear CCD 1.

The CCD driving clock Φ2 and the inverse clock, that is, CCD driving clock $\overline{\Phi 2}$, skip one in every five rising edges. On the other hand, the linear CCD 1 driven by the CCD driving clock Φ2 and CCD driving clock $\overline{\Phi 2}$ shifts the charges generated by the photo-electric conversion in each CCD register 13 per bit. Thus, the output of the pixel in the previous rising edge is withheld in every five rising edges, or where the rising edges are skipped.

The driving circuit 3, which receives the clock Φ1 and the timing adjusting clock (CLK-2) separately, includes a flip-flop 36 for generating a non-skipped driving clock Φ3.

Further, the driving circuit 3 generates the sampling clock and A/D converting clock separately using a flip-flop 37, AND circuits 38 and 39 based on the clock Φ1 and timing adjusting clock (CLK-2), and outputs the same to the digital converting circuit 2 of FIG. 1 separately.

In the digital converting circuit 2, the switching noise in the CCD output VD is removed through data sampling by charging the capacitor 26 while the sample clock stays at the high level. On the other hand, the A/D converter 24 receives the A/D converting clock, and in response, outputs an A/D converting value at the rising edge of the same to the noise-free CCD output VD. As a result, the CCD output VD is converted into multi-data digital image output VE twice where the rising edges are skipped.

Figure 16:
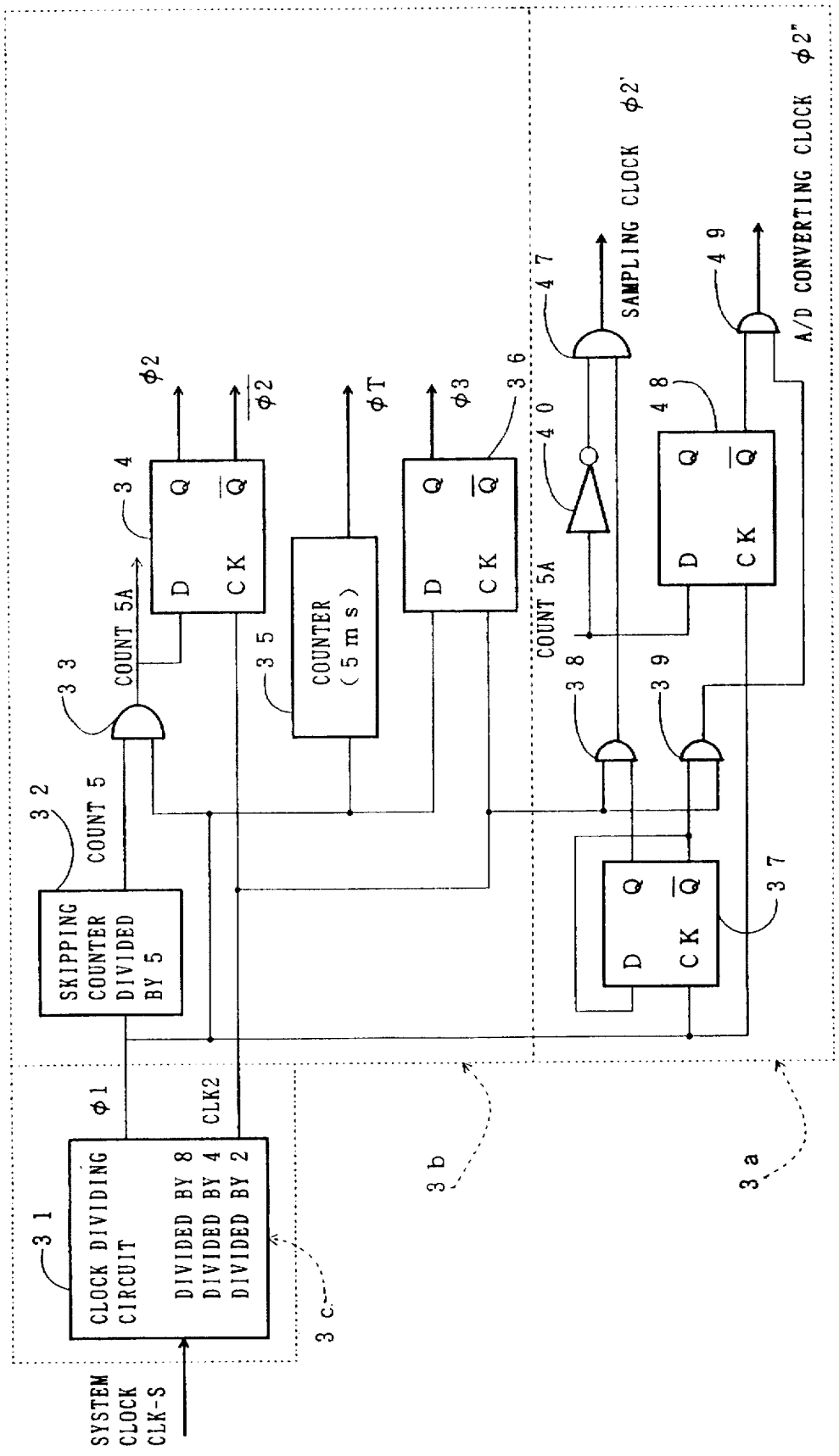
FIG. 16 is a block diagram of a driving circuit of the image processing apparatus in accordance with the second embodiment.
Figure 17:
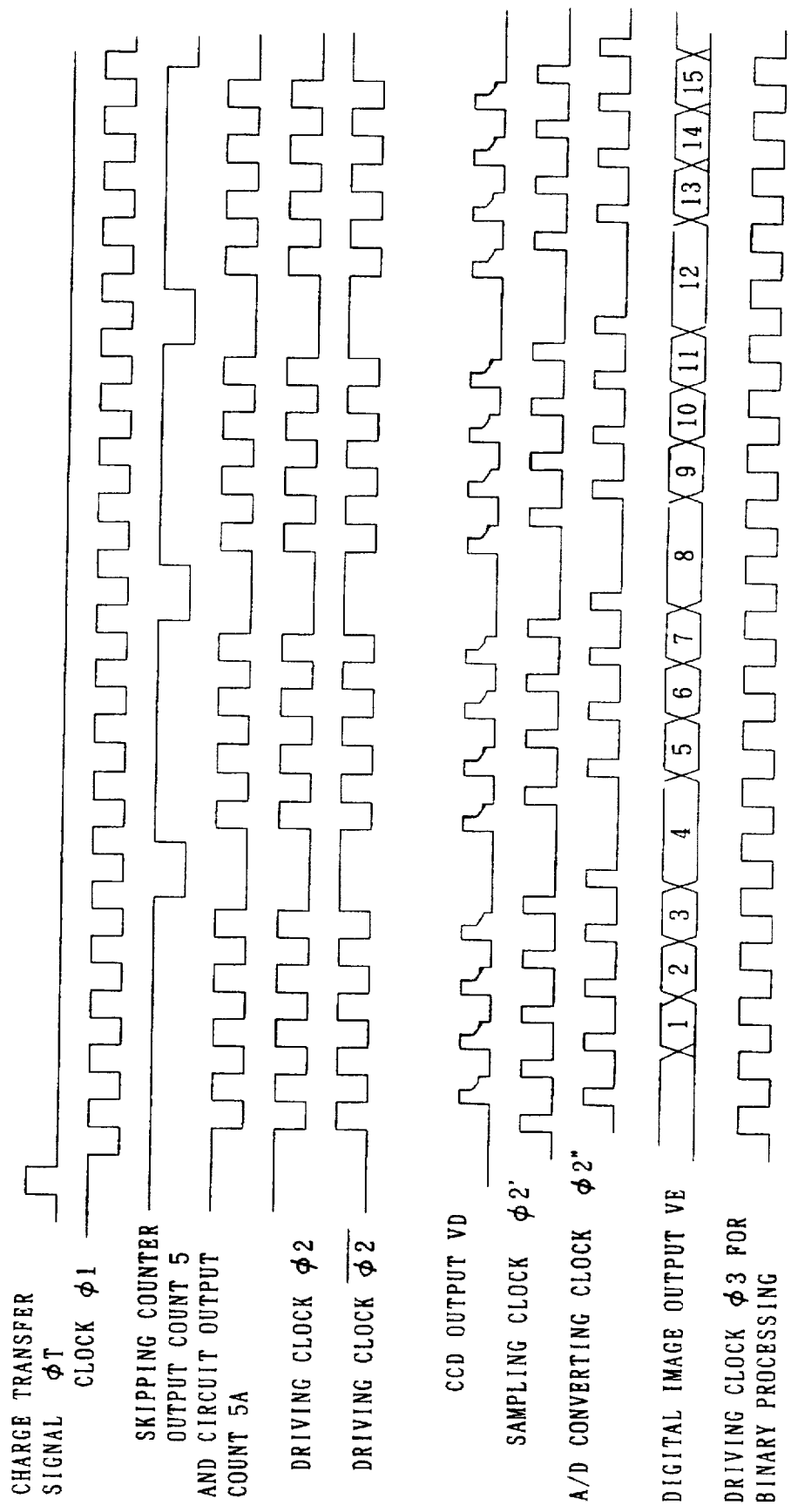
FIG. 17 shows a timing chart of the driving circuit.

In contrast to the driving circuit of FIG. 14, in the driving circuit of the second embodiment shown in FIGS. 16 and 17, an AND circuit 47 is provided to receive an output from the AND circuit 38 and an output (COUNT 5A) from the AND circuit 33 through the inverter 40 and output the sampling clock.

Further, in the above driving circuit, the sampling clock and A/D conversion clock skip in the same manner as the driving clock Φ2. Thus, the resulting digital image output VE is in effect a signal skipping in the above manner. Therefore, converting the digital image output VE thus generated based on the driving clock Φ3 outputted from the flip-flop 36 yields an extended binary signal.

Figure 18:
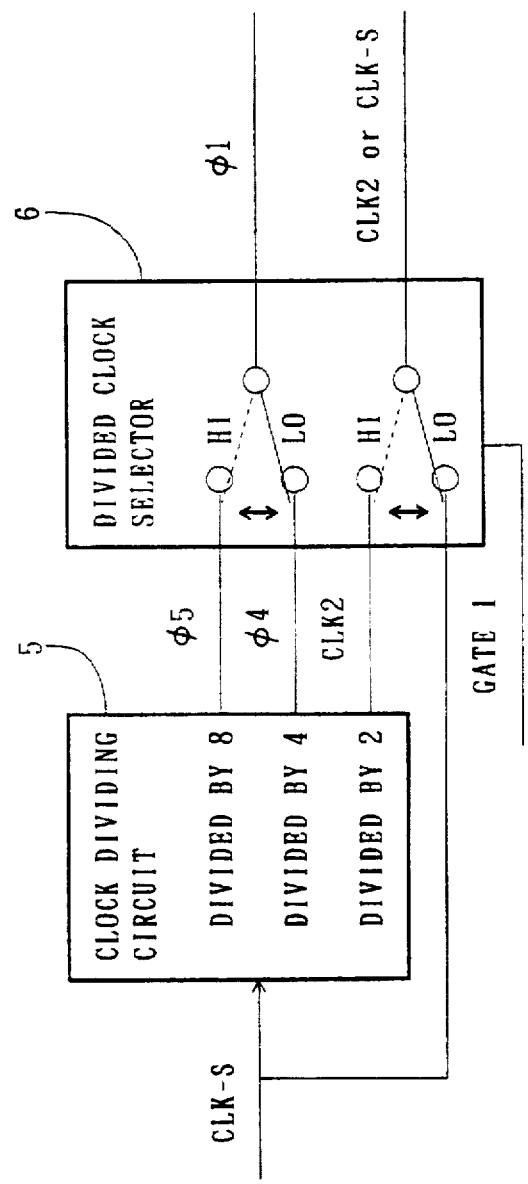
FIG. 18 is a block diagram of a clock dividing circuit and a clock selector of the image processing apparatus in accordance with the third embodiment.

For further understanding, each component of the image processing apparatus of the third embodiment will be explained in the following. To begin with, as shown in FIG. 18, the clock dividing circuit 5 is a circuit to output two clock systems to the clock selector 6 in the same manner as the above dividing operation: a clock system for one pixel based on the clock divided by 8; and a high-speed frequency clock system for one pixel based on the clock divided by 4.

The clock selector 6 switches the driving clock Φ1 between the high-speed clock system and low-speed clock system based on the control signal (GATE 1) from the range judging circuit 7. In the high-speed clock system, the system clock (CLK-S) divided by 4 is the driving clock Φ1 when the control signal (GATE 1) is low. On the other hand, the system clock (CLK-S) divided by 8 is the driving clock Φ1 when the control signal (GATE 1) is high.

Figure 19:
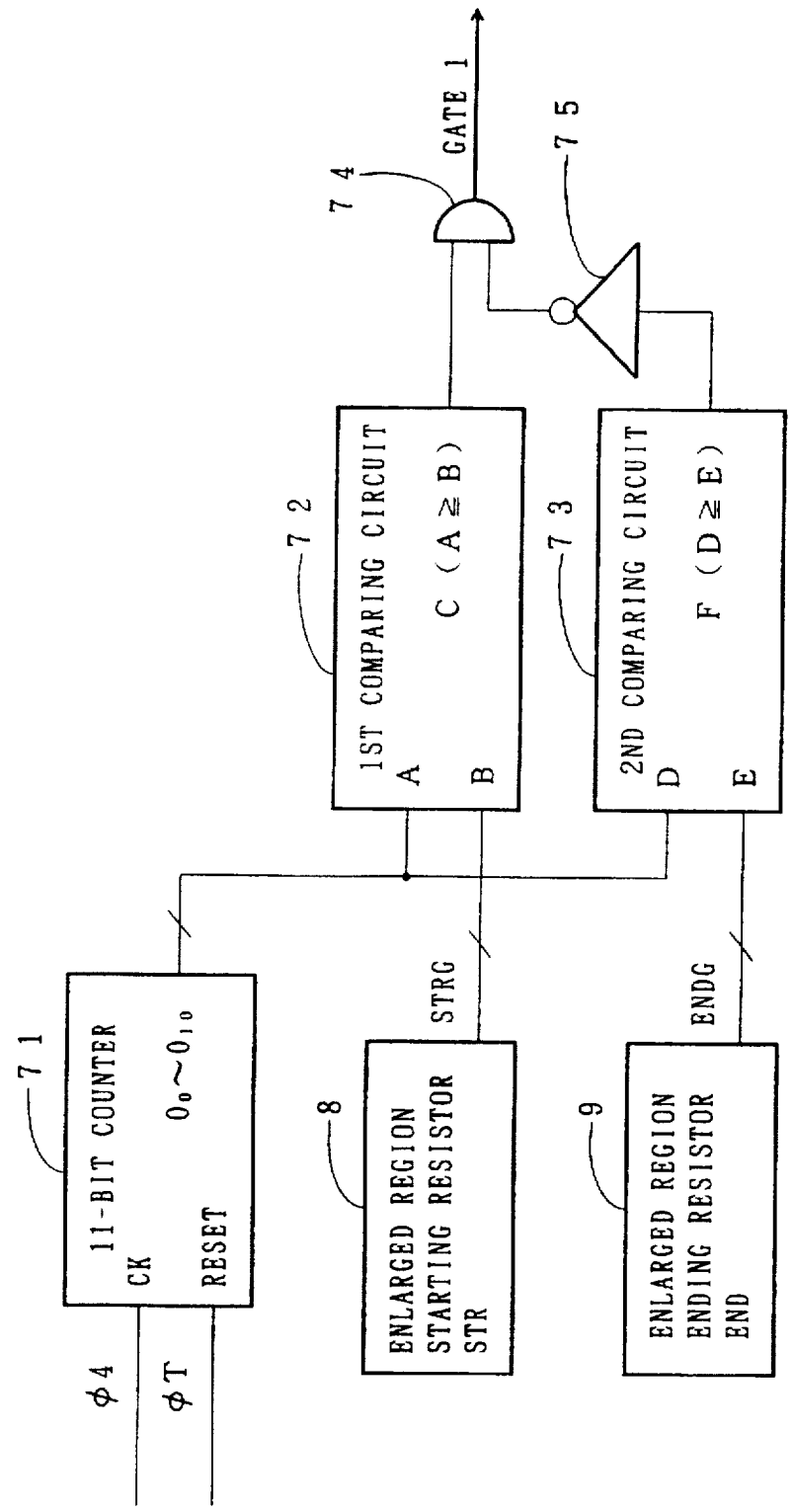
FIG. 19 is a block diagram of a region judging circuit of the above image processing apparatus.
Figure 20:
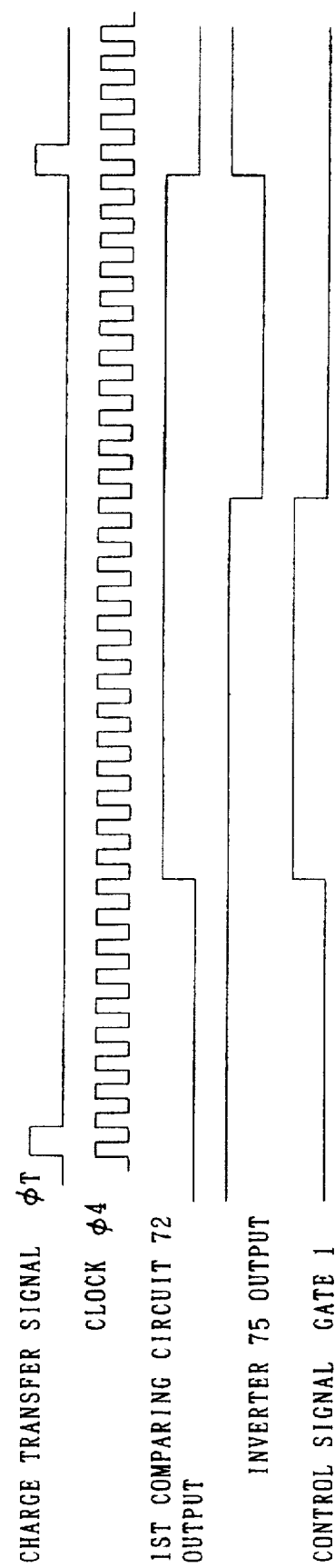
FIG. 20 shows a timing chart of the above region judging circuit.

As shown in FIGS. 19 and 20, the enlarged region starting register 8, enlarged region ending register 9, and region judging circuit 7 count a clock Φ4 made by dividing the system clock (CLK-S) by means of the 11-bit counter circuit 71, and the count output $0_0$–$0_{10}$ therefrom is inputted into the A terminal of a comparing circuit 72 and the D terminal of a comparing circuit 73, respectively.

Here, the start count value (STRG) is preset in the enlarged region starting register 8, which is inputted into the B terminal of the comparing circuit 72. Accordingly, the comparing circuit 72 compares the count output inputted at the A terminal with the start count value (STRG), and when the former becomes equal to or exceeds the latter, the output terminal C of the comparing circuit 72 is changed to the high level from the low level.

Likewise, the end count value (ENDG) is preset in the enlarged region ending register 9, which is inputted into the E terminal of the comparing circuit 73. Accordingly, the comparing circuit 73 compares the count output inputted at the D terminal with the end count value (ENDG), and when the former becomes equal to or exceeds the latter, the output terminal F of the comparing circuit 73 is changed to the high-level from the low-level.

The output from the output terminal C is inputted into either input terminal of an AND circuit 74, while the output from the output terminal F is inputted into the other input terminal through the inverter 75. As a result, the control signal (GATE 1) indicating the enlarged region is generated based on the start count value (STRG) and end count value (ENDG).

Figure 21:
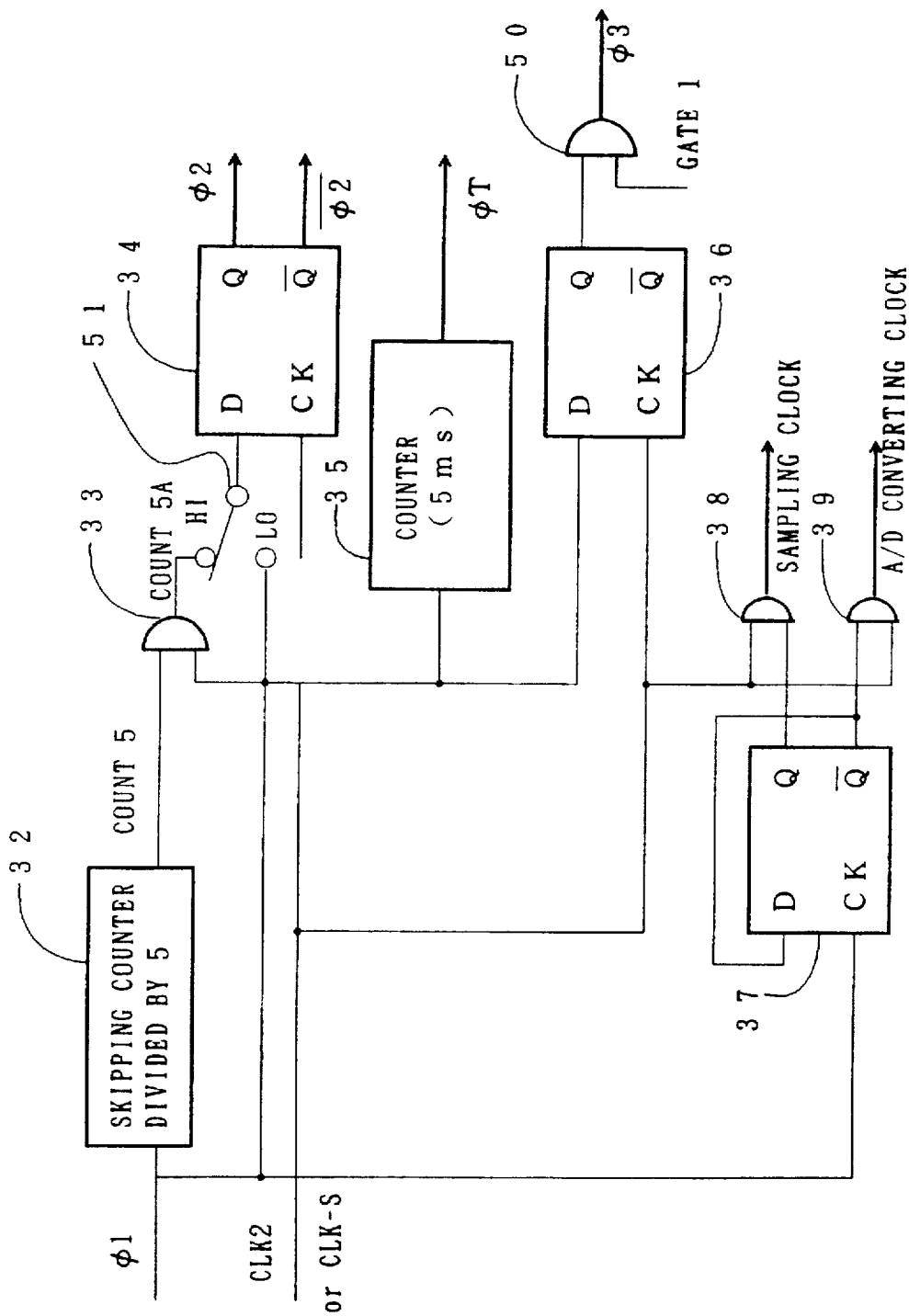
FIG. 21 is a block diagram of the driving circuit of the above image processing apparatus in accordance with the third embodiment.
Figure 22:
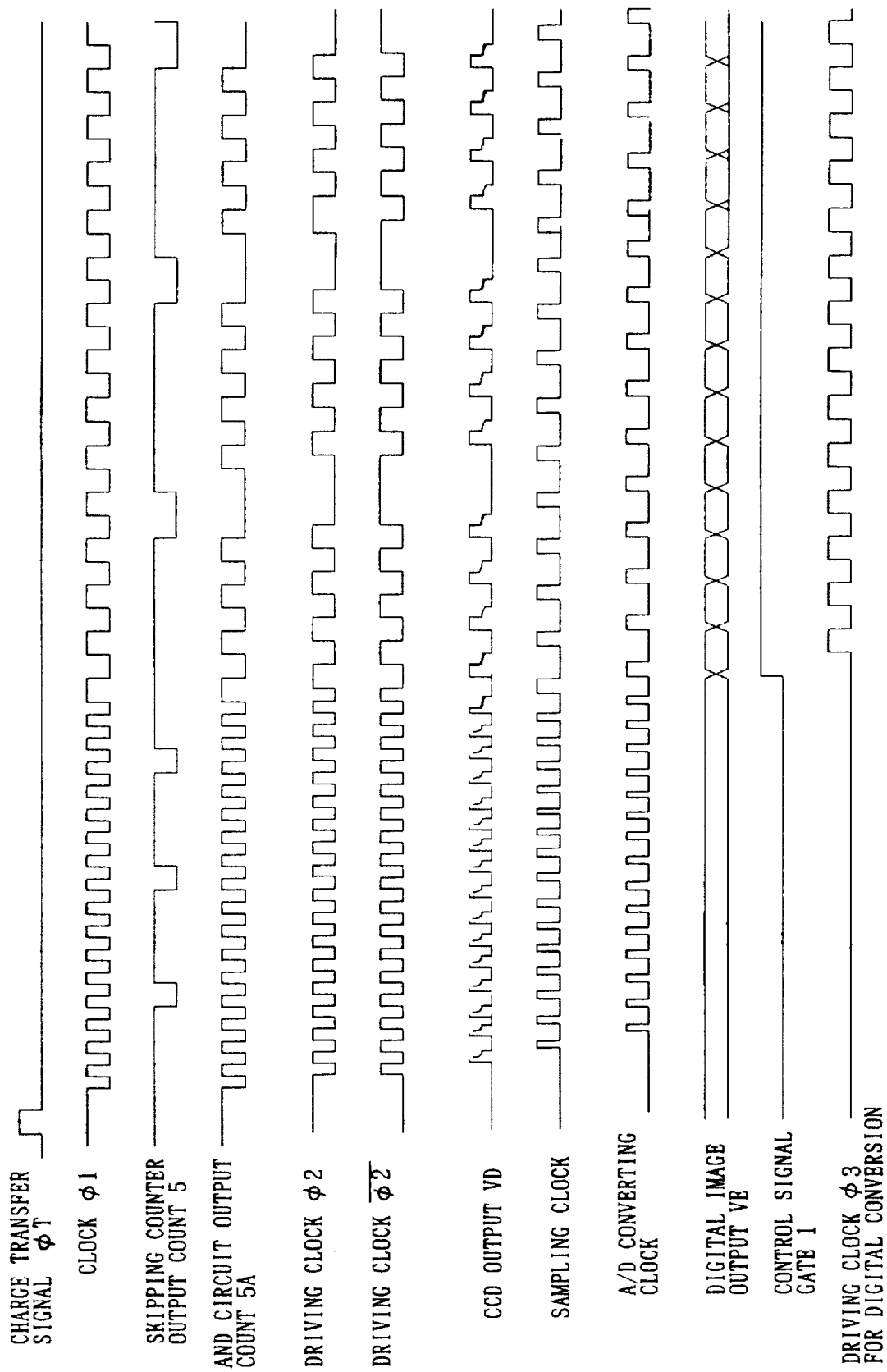
FIG. 22 shows a timing chart of the above driving circuit.
Figure 23:
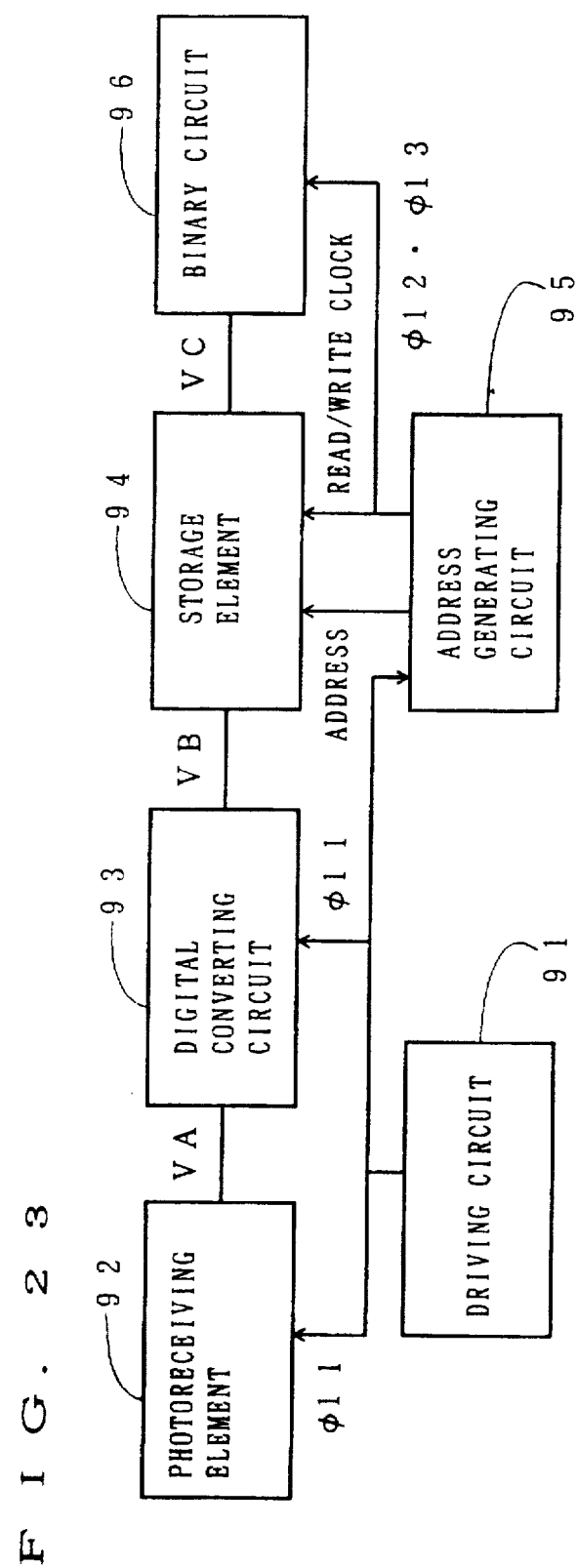
FIG. 23 is a block diagram of a conventional image processing apparatus.

In the driving circuit 3 of the third embodiment shown in FIGS. 21 and 22, an AND circuit 50 receiving an output Q from the flip-flop 36 at either input terminal while receiving the control signal (GATE 1) at the other input terminal is provided.

Further, the above driving circuit 3 includes a switch 51, so that the output from the AND circuit 33 is inputted into the D terminal of the flip-flop 34 when the control signal (GATE 1) is in the high-level (HI), while the clock Φ1 is inputted into the same when the control signal (GATE 1) is in the low-level (LO).

Here, when the control signal (GATE 1) is in the low-level, the driving clock Φ3 from the AND circuit 50 remains at the low-level as well, and the driving clock Φ2 and driving clock $\overline{\Phi2}$ are non-skipping high-speed clocks due to the switch 51. Thus, the charges stored for the non-enlarged region in the linear CCD 1 can be eliminated swiftly, or released at high speeds.

On the other hand, when the control signal (GATE 1) is in the high-level, the output from the AND circuit 50 serves as the non-skipping driving clock Φ3, while the driving clock Φ2 and driving clock $\overline{\Phi2}$ serve as the skipping clocks.

Thus, it is understood that in the driving circuit 3, the driving clock Φ3 controlling the digital converting circuit 2 and binary circuit 4 is generated only for the region subject to enlargement. This control disallows the digital converting circuit 2 and binary circuit 4 to output unwanted digital signals causing the noise. In addition, since the driving clock is optimized as described above, the enlarging processing of the enlarged region is carried out smoother.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:
    a photoreceiving element for, upon receipt of an image in the form of light, outputting an analog image signal serially based on a first clock, said analog image signal representing each pixel of said image;
    converting means for, upon input of said analog image signal, converting said analog image signal into a digital image signal based on a second clock; and
    driving means for outputting said first and second clocks, rising edges in said first clock being skipped a first predetermined number of times during every occurrence of a second predetermined number of rising edges in said second clocks whereby said outputting of said analog image from said photoreceiving element is withheld during said skipping of said rising edges in said first clock.

2. The image processing apparatus as defined in claim 1, wherein said driving means includes switching means for, when setting a first region where said image is enlarged and a second region where said image is not enlarged, outputting said first clock for said first region, and a third clock for said second region, said third clock having more rising edges than said second clock.

3. The image processing apparatus as defined in claim 1, wherein said photoreceiving element has an array of shift registers.

4. The image processing apparatus as defined in claim 1 further comprising a binary circuit for converting said digital image signal into binary data based on a fourth clock outputted from said driving means, rising edges in said second clock being skipped a third predetermined number of times during every occurrence of a fourth predetermined number of rising edges of said fourth clock, whereby outputting of said digital image signal from said converting means is withheld during said skipping of said rising edges in said second clock.

5. The image processing apparatus as defined in claim 1, wherein said photoreceiving element is an array of charge coupled devices.

6. The image processing apparatus as defined in claim 5 further comprising a sampling circuit for removing switching noise contained in said analog image signal.

7. The image processing apparatus as defined in claim 6, wherein said sampling circuit includes a switch for controlling an ON/OFF state of said analog image signal based on said first clock.

8. An image processing apparatus comprising:
    a photoreceiving element for, upon receipt of an image in the form of light, outputting an analog image signal serially based on a first clock, said analog image signal representing each pixel of said image;
    a converting member for, upon input of said analog image signal, converting said analog image signal into a binary signal based on a second clock; and
    driving means for outputting said first and second clocks, rising edges in said first clock being skipped a first predetermined number of times during every occurrence of a second predetermined number of rising edges in said second clock, whereby said outputting of said analog image from said photoreceiving element is withheld during said skipping of said rising edges in said first clock.

9. An image processing apparatus for performing enlarged-scale image processing comprising:
    a photoreceiving element for, upon receipt of an image in the form of light, outputting an analog image signal serially based on a first clock, said analog image signal representing each pixel of said image;
    a converting member for, upon input of said analog image signal, converting said analog image signal into a digital image signal based on a second clock; and
    a driving circuit for outputting said first and second clocks, rising edges in said first clock being skipped a first predetermined number of times during every occurrence of a second predetermined number of rising edges in said second clock, whereby said outputting of said analog image from said photoreceiving element is withheld during said skipping of said rising edges in said first clock.

10. The image processing apparatus as defined in claim 9, wherein said driving circuit includes a switching circuit for, when setting a first region where said image is enlarged and a second region where said image is not enlarged, outputting said first clock for said first region, and a third clock for said second region, said third clock having more rising edges than said second clock.

11. The image processing apparatus as defined in claim 9, wherein said photoreceiving element has an array of shift registers.

12. The image processing apparatus as defined in claim 9 further comprising a binary circuit for converting said digital image signal into binary data based on a fourth clock outputted from said driving circuit, rising edges in said second clock being skipped a third predetermined number of times during every occurrence of a fourth predetermined number of rising edges of said fourth clock, whereby outputting of said digital image signal from said converting member is withheld during said skipping of said rising edges in said second clock.

13. The image processing apparatus as defined in claim 9, wherein said photoreceiving element is an array of charge coupled devices.

14. The image processing apparatus as defined in claim 13 further comprising a sampling circuit for removing switching noise contained in said analog image signal.

15. The image processing apparatus as defined in claim 14, wherein said sampling circuit includes a switch for controlling an ON/OFF state of said analog image signal based on said first clock.

16. The image processing apparatus as defined in claim 12, where said third predetermined number is the same as said first predetermined number and said fourth predetermined number is the same as said second predetermined number.

* * * * *